United States Patent
Ai et al.

(10) Patent No.: US 11,958,032 B2
(45) Date of Patent: Apr. 16, 2024

(54) COMPOSITE COMPRISING GREEN RUST AND CARBON FOR ENVIRONMENTAL REMEDIATION

(71) Applicant: UNIVERSITY OF COPENHAGEN, Copenhagen K (DK)

(72) Inventors: Jing Ai, København Ø (DK); Weizhao Yin, Guangdong (CN); Hans Christian Bruun Hansen, Lund (SE)

(73) Assignee: University of Copenhagen, Copenhagen K (DK)

( * ) Notice: Subject to any disclaimer, the term of this patent is extended or adjusted under 35 U.S.C. 154(b) by 132 days.

(21) Appl. No.: 16/769,669

(22) PCT Filed: Dec. 4, 2018

(86) PCT No.: PCT/EP2018/083445
§ 371 (c)(1),
(2) Date: Jun. 4, 2020

(87) PCT Pub. No.: WO2019/110568
PCT Pub. Date: Jun. 13, 2019

(65) Prior Publication Data
US 2022/0080381 A1   Mar. 17, 2022

(30) Foreign Application Priority Data

Dec. 7, 2017 (EP) ..................................... 17205890
Oct. 9, 2018 (EP) ..................................... 18199370

(51) Int. Cl.
*B01J 20/20* (2006.01)
*B01J 20/02* (2006.01)
(Continued)

(52) U.S. Cl.
CPC .......... *B01J 20/20* (2013.01); *B01J 20/0229* (2013.01); *B01J 20/0277* (2013.01); *B01J 20/0281* (2013.01); *B01J 20/0288* (2013.01); *B01J 20/06* (2013.01); *B01J 20/3078* (2013.01); *B09C 1/002* (2013.01); *B09C 1/08* (2013.01); *C02F 1/286* (2013.01); *B09C 2101/00* (2013.01); *C02F 1/281* (2013.01); *C02F 1/283* (2013.01);
(Continued)

(58) Field of Classification Search
CPC .............................. B01J 20/20; B01J 20/0229
See application file for complete search history.

(56) References Cited

U.S. PATENT DOCUMENTS

2008/0011686 A1* 1/2008 Banavalie ............. C02F 1/5245
210/688
2015/0001157 A1 1/2015 Johnson

FOREIGN PATENT DOCUMENTS

BR   PI1104409 A2   8/2015
CN   105413094 A    3/2016
WO   2010/127757 A2  11/2010

OTHER PUBLICATIONS

Chia et al. "Imaging of mineral-enriched biochar by FTIR, Raman and SEM-EDX" Vibrational Spectroscopy, 62, 2012, 248-257. (Year: 2012).*

Fan et al., "Chemical Reactivity probes for assessing abiotic natural attenuation by reducing iron minerals", Env. Sci. & Tech., 2016, vol. 50, pp. 1868-1876.

(Continued)

*Primary Examiner* — Peter F Godenschwager
(74) *Attorney, Agent, or Firm* — BakerHostetler

(57) ABSTRACT

The invention regards a composite for environmental remediation, comprising: —one or more green rust compound(s) or green rust precursor(s), and—one or more biochar(s).

24 Claims, 24 Drawing Sheets

(51) Int. Cl.
    *B01J 20/06*     (2006.01)
    *B01J 20/30*     (2006.01)
    *B09C 1/00*     (2006.01)
    *B09C 1/08*     (2006.01)
    *C02F 1/28*     (2023.01)
    *C02F 101/36*     (2006.01)
    *C02F 101/38*     (2006.01)
    *C02F 103/06*     (2006.01)

(52) U.S. Cl.
    CPC ...... *C02F 2101/36* (2013.01); *C02F 2101/38* (2013.01); *C02F 2103/06* (2013.01)

(56) References Cited

OTHER PUBLICATIONS

Kopinke et al., "Reductive Dechlroninaion in water; Interplay of sorption and reactivity", Appl. Catalysis B: Environmental; 2016, vol. 81, pp. 747-753.

Li Hui et al., "Wheat straw biochar-supported nanoscale zerovalent iron for removal of trichloroethylene from groundwater", Plos One, Mar. 6, 2017 (Mar. 6, 2017), pp. 1-10.

Liu Jing et al: "Effect of reactive bed mineralogy on arsenic retention and permeability of synthetic arsenic-containing acid mine drainage", Journal of Colloid and Interface Science, US, vol. 394, Dec. 29, 2012 (Dec. 29, 2012), pp. 530-538.

Woojin Lee et al: "Abiotic Reductive Dechlorination of Chlorinated Ethylenes by Iron-Bearing Soil Minerals. 2. Green Rust", Environmental Science & Technology, vol. 36, No. 24, Dec. 1, 2002 (Dec. 1, 2002), pp. 5348-5354.

\* cited by examiner (a)

(b)

(c)

COMPOSITE COMPRISING GREEN RUST AND CARBON FOR ENVIRONMENTAL REMEDIATION

CROSS-REFERENCE TO RELATED APPLICATIONS

This application is the National Stage of International Patent Application No. PCT/EP2018/083445, filed Dec. 4, 2018, which claims the benefit of European Patent Application No. 17205890.1, filed Dec. 7, 2017 and European Patent Application No. 18199370.0, filed Oct. 9, 2018, the disclosures of which are incorporated herein by reference in their entireties.

FIELD OF INVENTION

The present invention relates to a composite and a suspension for environmental remediation, as well as a method for environmental remediation.

BACKGROUND OF INVENTION

Technologies for removal of pollutants or contaminants from environmental media such as soils, sediments, groundwaters, wastes, and surface waters, are often necessary for the polluting industries, and are a requirement for the institutions and companies that perform environmental remediation. The removal is essential for human health and ecosystems which may be affected, both within the near and distant surroundings, since pollutants may be transported over long distances. The removal of pollutants or contaminants is also referred to as environmental remediation.

A widespread class of pollutants are halogenated organic chemicals, such as solvents of chlorinated hydrocarbons, e.g. chlorinated ethylenes. Organic halogen compounds are typically highly toxic, and some even carcinogenic. However, due to their high chemical stability and their physicochemical properties, organic halogen compounds find widespread use in several industries. For example, chlorinated hydrocarbons are used for cleaning, degreasing, dry-cleaning clothes, pharmaceutical and personal care products manufacturing, and as coolant and pesticide; brominated organic compounds may be used in chemical processing industries as e.g. flame retardants; and fluorinated organics are commonly used for packaging materials, such as foams and coatings. The production of the most toxic organic halogen compounds has been reduced or banned, and in fact many of the sites that today are polluted with these compounds are due to former activities.

Spills and wastes from industries producing or using organic halogen compounds result in recalcitrant pollution that is difficult to remedy, since the halogenated organic solvents may be in DNAPL form. DNAPL means a dense non-aqueous phase liquid that is both denser than water and immiscible or does not easily dissolve in water. For example, chlorinated solvents are heavier than water, and thus free phases of the solvents may penetrate deeply into soils, sediments, and groundwater reservoirs, where they are difficult to remove. In addition chlorinated solvents may evaporate through gas filled pores in soils and sediments to aboveground buildings and thus contaminate via the gas phase.

Environmental remediation of halogenated hydrocarbons, or halogenated organic compounds, and especially chlorinated solvents, has been carried out through a number of physical, chemical and microbial techniques such as pump-and-treat, thermal evaporation, use of halorespiring microorganisms, oxidation by strong oxidizing agents, and use of strong reducants, such as zero-valent iron (ZVI).

In recent years nano-particle formulations of ZVI (nZVI) has been used for the remediation. The media is exposed, e.g. by injection, to the suspension, and the nanoscale iron acts as a reducing agent, which reductively degrades the chlorinated solvent to less harmful products, such as converting or degrading chlorinated ethylene into ethylene. However, the nZVI technology is limited by high cost and limited efficiency, e.g. due to the nZVI suffering from low particle stability due to the inherent tendency of the nanoscaled nZVI to agglomerate, and due to formation of passivating corrosion layers on the particles. Furthermore, nZVI is potentially ecotoxic, and may result in unwanted byproducts such as vinylchloride.

To improve the stability of the nZVI technology, composites comprising nanoscale zero-valent iron dispersed on a support of wheat straw biochar, has been described by Li et al. [1].

Alternative materials to nZVI for environmental remediation of chlorinated solvents have been described, including mixed valent iron hydroxides, such as such as layered Fe(II)-Fe(III) hydroxides, also known as green rusts comprising Fe(II) and Fe(III), as mentioned in Fan et al. [2].

Despite the advances, there is a need for improved technologies for environmental remediation that are more efficient, mobile, such as comprising particles that are mobile, stable, and more environmental friendly e.g. that does not cause production of toxic intermediates, as well as cheaper, simpler and safer to apply.

SUMMARY OF INVENTION

The present disclosure provides a composite for use in environmental remediation, such as remediation of reducible organic hydrocarbons. The environmental remediation may include dehalogenation, and/or remediation of nitro aromatic compounds and/or reducible metals and metalloid species, which may be heavy metals. The composite is particularly suitable for the remediation of halogenated organic chemicals, or halogenated hydrocarbons, such as solvents of chlorinated hydrocarbons, e.g. chlorinated ethylenes.

The disclosed composite provides a more efficient dehalogenation of the pollutants or contaminants. Furthermore, the composite has a high stability and may have a high mobility making it suitable for being exposed to environmental media such as soils, sediments, groundwaters, and surface water. The composite is further simple and cheap to manufacture in large-scale, and comprises non-toxic materials, thereby making it easy to handle, apply, and dispose of, as well as sustainable.

A main aspect of the invention relates to a composite for environmental remediation, comprising:
one or more green rust compound(s),
one or more carbon composition(s) obtained by pyrolysis.

In a preferred embodiment, the carbon composition(s) are obtained by pyrolysis and optionally further acid treatment.

In a preferred embodiment, the one or more carbon composition(s) obtained by pyrolysis is bone char. In a further preferred embodiment, the one or more carbon composition(s) obtained by pyrolysis is acid treated bone char. Bone char may be produced by high-temperature carbonization of bone meal, and typically comprises 80-90 wt % hydroxyapatite and 10 wt % carbonaceous materials or carbon composition(s).

For acid treated bone char, the majority of hydroxyapatite is removed, and the residual carbonaceous material forms the carbon composition(s).

A surprisingly efficient environmental remediation was observed for carbon composition(s) obtained by pyrolysis, which advantageously comprise phosphorus, and/or nitrogen, and/or sulphur, and/or oxygen, and/or hydrogen.

A first aspect of the invention relates to a composite for environmental remediation, comprising:
  one or more green rust compound(s),
  one or more carbon composition(s) obtained by pyrolysis,
  wherein at least one of the carbon compositions comprises phosphorus.

Another first aspect of the disclosure relates to a composite for environmental remediation, comprising:
  one or more green rust compound(s),
  one or more carbon composition(s) obtained by pyrolysis,
  wherein at least one of the carbon compositions comprises phosphorus, and/or nitrogen, and/or sulphur, and/or oxygen, and/or hydrogen.

Another first aspect of the disclosure relates to a composite for environmental remediation, comprising:
  one or more green rust compound(s) or green rust precursor(s), and
  one or more biochar(s).

A second aspect of the invention relates to a suspension for environmental remediation, comprising:
  the composite according to the first aspect,
  one or more fluid(s), and
  optionally one or more stabilizing agent(s).

A third aspect of the invention relates to a method for environmental remediation, comprising the steps of:
  providing the composite according to the first aspect, optionally in the form of the suspension according to the second aspect,
  contacting the composite with a contaminated media,
  wherein the contacting is obtained by mixing, flushing, and/or injection pumping the composite into the media.

A fourth aspect of the invention relates to the use of the composite according to the first aspect for a suspension.

A fifth aspect of the invention relates to the use of the composite according to the first aspect or the suspension according to the second aspect for environmental remediation of a contaminated media, such as groundwater, waste water, soils, and/or sediments.

A sixth aspect of the invention relates to of the composite according to the first aspect or the suspension according to the second aspect for the method according to the third aspect.

DESCRIPTION OF DRAWINGS

The invention will in the following be described in greater detail with reference to the accompanying drawings.

FIGS. 1a and 1b show the process in general, and FIG. 1c shows an example of pathway for reductive dehalogenation of chlorinated ethylenes (PCE) using the composite according to the disclosure.

FIG. 7 shows XRD traces of green rust (GR) and GR+ bone char (BC, Fluka) composites, using Co K-alpha radiation, and where the upper grey curve shows fresh $GR_{Cl}$, and the middle curve (lighter grey curve) shows 6 days aged $GR_{Cl}$+BC, and the bottom curve (darker grey curve) shows fresh $GR_{Cl}$+BC.

DETAILED DESCRIPTION OF THE INVENTION

The composite of the present disclosure may be used for any type of environmental remediation. Advantageously, the composite is used as reducing agent for dehalogenation. However, the composite may also be applied for remediation of any chemically reduceable contaminant, such as nitro aromatic compounds that are reduced to the corresponding amino compounds, and for the remediation of nitrate or nitrates, nitro-organic compounds, metal oxyanions, such as chromate, selenate, and uranyl.

Figure 1:
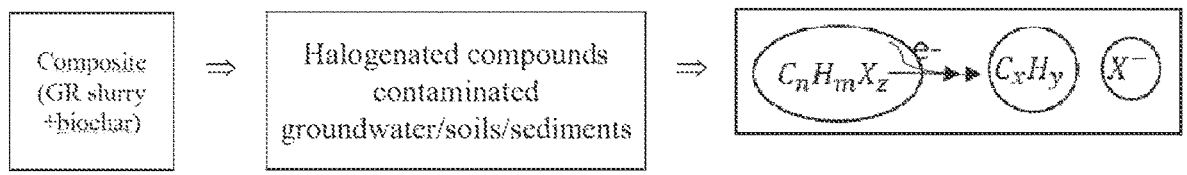
FIG. 1 shows an embodiment of the process for the dehalogenation remediation using an embodiment of the composite according to the disclosure.
Figure 1:
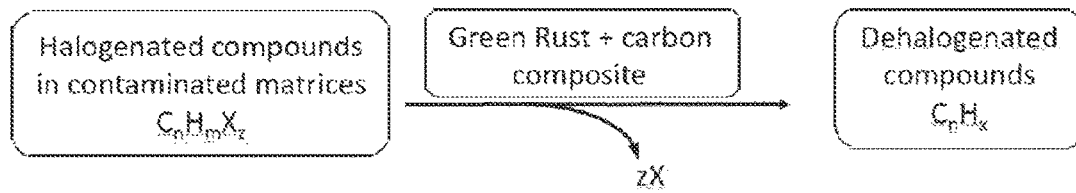
Figure 1:
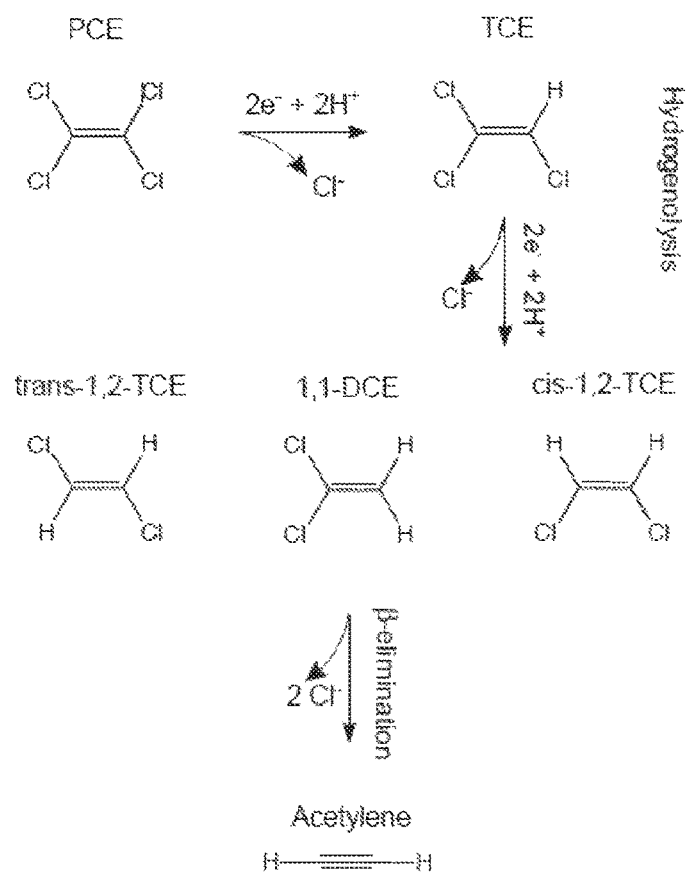

FIGS. 1a and 1b show embodiments of the process for the dehalogenation remediation using an embodiment of the composite according to the disclosure. In FIG. 1a, the composite is embodied as a composite of green rust (GR) and biochar, and in FIG. 1b, the composite is embodied as a composite comprising one or more green rust (GR) compounds, and one or more carbon compositions. Correspondingly, the composite may be embodied as comprising one or more green rust precursor(s) and one or more biochars. The composite is brought into contact with the contaminated media, or contaminated matrix, i.e. groundwater, waste water, soils, and/or sediments, whereby the pollutants are degraded or converted by the reducing power of the composite. FIG. 1c shows an example of pathway for reductive dehalogenation of chlorinated ethylenes (PCE) using the composite according to the disclosure.

Thus, the remediation is a reduction process, where the composite acts as the reducing agent and provides the supply of electrons. The reduction process is also illustrated below in equations (1) and (2), where $C_nH_mX_z$ denotes a halogenated hydrocarbon, which is reduced into a hydrocarbon ($C_xH_y$, such as $C_nH_{m+1}X_{z-1}$ or $C_nH_{m-1}X_{z-1}$) and a soluble halogen ion ($X^-$) either by hydrogenolysis (1) or by elimination (2):

$$C_nH_mX_z + 2e^- + H^+ \rightarrow C_nH_{m+1}X_{z-1} + X^- \quad (1)$$

$$C_nH_mX_z + 2e^- \rightarrow C_nH_{m-1}X_{z-1} + H^+ + X^- \quad (2)$$

For example, the halogenated hydrocarbon may be trichloroethylene, which is converted into acetylene due to elimination reaction as illustrated in equation (3) below. Equation (3) shows the unbalanced net reaction. Typically, the complete reaction of chlorinated ethenes and ethanes is a complex transformation pathway including multiple intermediates.

$$C_2HCl_3 + 4e^- + H^+ \rightarrow C_2H_2 + 3Cl^- \quad (3)$$

It was seen that the composite according to the present disclosure is a surprisingly strong reducing agent for chemically reducible pollutants or contaminants. Thus, the composite according to the present disclosure reacts surprisingly fast with pollutants, such as the exemplified chlorinated pollutants. Thus, the composite according to the disclosure provides a surprisingly efficient remediation or removal process. Compared to conventional remediation technologies, such as techniques based on nZVI, complete remediation may be obtained within hours or days, which may be much faster than conventional methods.

It was further seen that the composite according to the present disclosure has a high selectivity for producing acetylene, as illustrated in equation (3). For example, in the Example 2 described below, acetylene was the main detectable dechlorinated product by gas chromatography (GC) irrespective of the initial compound being PCE, TCE or DCE.

Thus, the halogenated organic chemicals is mainly reduced to non-harmful products, such as acetylene. The non-harmful products further increase the environmental friendly aspect of the remediation. Furthermore, the non-harmful products may be microbially degraded. Further the composite according to the present invention may improve the biodegradation, since chars comprising phosphorus provide both surfaces for microbial colonization and nutrient (phosphorus) for the microorganisms.

The surprisingly fast reduction kinetics of the composite according to the present disclosure is further described in Examples 1-10, and FIGS. 2-13, and the kinetics are compared with other composites or compounds in Examples 5 and 9. An embodiment of a method for testing the reduction kinetics of the composite according to the present disclosure is described in Example 1.

Remediation Method

The composite of the present disclosure may be brought into contact with the contaminated media, i.e. groundwater, waste water, waste, such as solid waste, soils, and/or sediments, in different ways. For example, the composite may be part of a slurry or suspension that is mixed with the contaminated media, or delivered to an aquifer, water reservoir, or contaminated soils, by flushing or injection pumping. Thus, the composite may be delivered to less accessible contaminated sites, such as contaminated areas under houses and roads, as a reactive slurry.

Alternatively, the composite may be in the form of particles, optionally porous particles, or powder that is mixed or admixed into the contaminated media. The particles or powder may be made by any known techniques, such as precipitation. Optionally, the powder may be made by freeze drying.

Further alternatively, the composite as a powder may be incorporated into a solid structural form, such as a reactive surface, e.g. a plate, a rod, a filter, which may have the function of an electrode. The structural form may be shaped by common shaping techniques such as deposition (e.g. layer deposition or sedimentation on plates), extrusion, molding, and/or spraying, and may thus contain the composite according to the present disclosure.

The structural form comprising the composite may be contacted with the contaminated media by inserting the solid part into the media. For example a plate or a rod, which may further have the function as an electrode, comprising the reactive composite or particles or porous particles of the composite, may be forced into or mixed with the contaminated soil. Alternatively, if the contaminated media is in a fluid state, the contacting may be obtained by filtering the media through the structural form comprising the composite, i.e. the structural form will be a filter with a suitable fluid permeability.

Advantageously, the composite further comprises a support or a host, which may protect the composite, and thereby facilitate a slower release, and/or slower reduction reactivity or remediation, and/or a more long-term durable reduction reactivity or remediation.

The support or host may be in the form of a solid substrate onto which the composite is coated, or the support or host may be in the form of a porous substrate, onto which the composite is coated and/or included or impregnated or stuffed into. Thus, the composite may be in the form of a film, an aggregate, or a phase stuffed into a porous host. An example of a support or a host is diatomaceous earth. In an embodiment of the invention, the composite further comprises a support or a host. In a further embodiment, said support or host is a solid substrate or a porous substrate. In a further embodiment, said support or host comprises diatomaceous earth.

In an embodiment of the invention is provided a method for environmental remediation, comprising the steps of:
providing the composite according to present invention,
contacting the composite with a contaminated media, such as groundwater, soils, and/or sediments,
wherein the contacting is obtained by mixing, flushing, inserting or injection pumping the composite into the media, or by filtering the media through the composite.

In an embodiment of the invention, the composite is part of a suspension, or a solid structural form, such as a filter.

Figure 13:
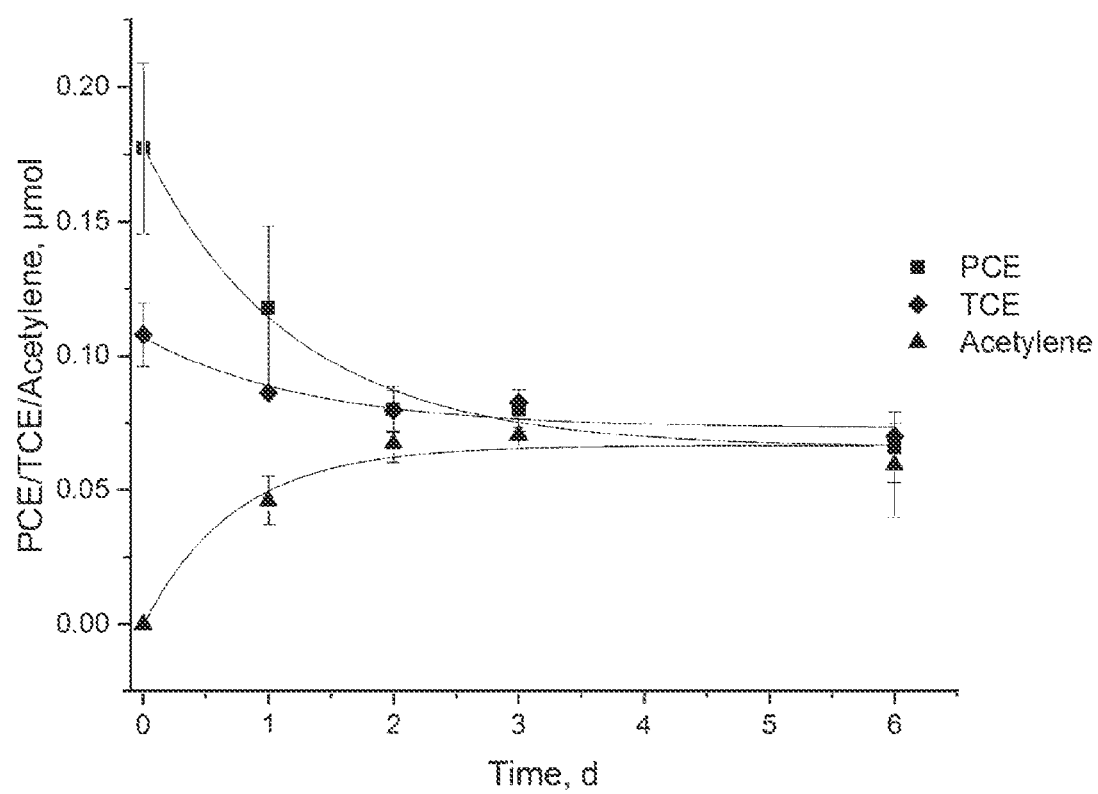
FIG. 13 shows data from Example 10, where the reduction of chlorinated solvents in the multi component mixture present in groundwater was tested. The figure shows the amounts in µmol of TCE (diamond symbols), PCE (square symbols), and acetylene (triangle symbols) as a function of time exposed to an embodiment of the composite according to the present disclosure.

The composite of the present invention may be used for remediation of any contaminated media, i.e. groundwater, waste water, waste, such as solid waste, soils, and/or sediments. Example 10 and FIG. 13 shows an embodiment of a remediation process in a complex multi component mixture corresponding to groundwater. Example 14 shows an embodiment of a remediation process in sediments, where the sediments are sand.

Stability

The durability and stability of the composite will depend on the degree of contact to other oxidants during storage before application, as well as during the remediation process. Poor durability and stability will occur, if the composite is exposed to other oxidants than the contaminants. Thus, the composite may act as reducing agent for these other components instead of reducing agent for the contaminants, and the efficiency of the remediation process will be decreased.

Sources of other oxidants commonly present in storage conditions, soils and groundwaters include oxygen and nitrate. Furthermore, other reactants like soluble silicic acid, bicarbonate, or certain metal cations, can sorb to the composite and decrease its reactivity. To minimise the contact with other oxidants, it is advantageous that the composite is stored within a closed container with a low oxygen permeability, or that the composite is part of a formulation such as a suspension, having a low solubility for nitrates, silicates, bicarbonate, and cations.

In an embodiment of the disclosure, the composite is stored within a closed container having a low oxygen permeability. In another embodiment of the invention, the composite is part of a formulation such as a suspension, configured to have a low solubility for oxidants, such as nitrates, silicates, bicarbonate, and/or metal cations.

In addition, the composite may be configured to have changeable reducing properties, such that the reducing properties are low during storage, and enhanced immediately prior to use. For example, a certain removable solute may block the reactivity of the composite. When the solute is removed, the reducing reactivity of the composite is present. Thus, the removable solute acts as a "switch" first blocking the reactivity, and later on the "switch" may be removed.

Said switch mechanism may be based on orthosilicic acid sorbing to reactive sites of the GR, and hence blocking for electron transfer. Later, the switch can be removed by a weak Fe(II) complexant, such as glycine. In an embodiment of the disclosure, the composite further comprises a removable solute, and in a preferred embodiment the removable solute is one or more orthosilicic acid(s).

The stability, or ageing, of the composite according to the present invention is further described in Example 4 and FIGS. 5-10. In Example 4 the remediation efficiency of a freshly prepared composite was compared to composites aged for from 1 day or more days, and up to 1 month and 2 months. It was indicated that the composite is surprisingly stable when stored in an aqueous suspension, and a high shelf-life of the composite suspensions was indicated.

Advantageously, the composite may be stable in anoxic conditions for more than 1 week, such as more than 2 weeks, such as more than 3 weeks, such as more than 4 weeks, such as more than 5 weeks.

Contaminants

The remediation process is exemplified above as a dechlorination process, i.e. for a chlorinated contaminant. However, the process may be equivalent efficient for any contaminant comprising one or more halogens, such as aliphatic or aromatic contaminants comprising one or more halogens, and thus effective for any dehalogenation process. Furthermore, the reducing power of the composite may be effective for reduction and remediation of other reducible contaminants, such as nitro aromatic compounds that are reduced to the corresponding amino compounds, and for remediation of nitrate, nitrates, nitro-organic compounds, and metal oxyanions, such as chromate, selenate, and uranyl. Most of the reducible halogen-containing contaminants are further listed as persistent organic pollutants (POPs) in the Stockholm Convention.

In an embodiment of the disclosure, the remediation is dehalogenation, and/or remediation of nitrates, nitro-organic compounds, nitro aromatic compounds, and/or metal oxyanions, such as chromate, selenate, and uranyl.

In an embodiment of the disclosure, the contaminants are compounds that is chemically reducible. In a further embodiment, the contaminants are selected from the group of: halogenated organic chemicals, such as chlorinated organic compounds, brominated organic compounds, fluorinated organic compounds, and any mixture thereof.

The present remediation method may be applied on any contaminated media, such as contaminated groundwater, waste water, waste, soils, and/or sediments. However, since the present invention may be applied by injection pumping, the remediation process may be particularly suitable for remediation of recalcitrant contamination, such as dense non-aqueous phase liquids (DNAPL).

In an embodiment of the disclosure, the contaminated media is selected from the group of: groundwater, waste water, soils, wastes, and/or sediments. In a further embodiment of the invention, the media is contaminated with recalcitrant contaminants, such as dense non-aqueous phase liquids (DNAPL).

It was found that the remediation process is especially efficient for halogenated organic chemicals. Examples of halogenated organic chemicals include chlorinated organic compounds, brominated organic compounds, and fluorinated organic compounds. The process was further seen to be especially efficient for solvents of chlorinated hydrocarbons, such as carbon tetrachloride and chlorinated ethylenes. Examples of chlorinated hydrocarbons that may be in a liquid state include: carbon tetrachlorides, trichloro acetic acid, and chlorinated ethylenes. Furthermore, examples of chlorinated ethylenes include: tetrachloroethylene (PCE), trichloroethylene (TCE), dichloroethylene, (1,2-DCE), and monochloroethylene (vinyl chloride).

In an embodiment, the contaminant is a solvent of a chlorinated hydrocarbon, preferably selected from the group of: carbon tetrachlorides, trichloro acetic acid, and chlorinated ethylenes, and further preferably is selected from the group of: tetrachloroethylene (PCE), trichloroethylene (TCE), dichloroethylene (1,2-DCE), monochloroethylene, and mixtures thereof.

The chlorinated hydrocarbons may have several names or synonyms as known to the skilled person. For example, tetrachloroethylene is also known as tetrachloroethene, perchloroethene, perchloroethylene, perc, PERC, and PCE. Further, dichloroethylene has three geometric isomers, cis-1,2-dichloroethene, trans-1,2-dichloroethene and 1,1-dichloroethene.

Suspension

As described above, the remediation process advantageously involve that the composite is in the form of a slurry or suspension that is delivered to an aquifer, water reservoir, or contaminated soil, by injection pumping. It is further seen that the remediation process including a suspension may be particular efficient for remediation including dehalogenation.

By the term "suspension" or "slurry" is meant a heterogeneous mixture containing solid particles that are suspended or dispersed within a fluid or liquid phase. Thus, the composite will be in the form of solid particles within a fluid phase. To facilitate uniform dispersion of the particles, and/or to avoid sedimentation of the particles within the fluid phase, it may be advantageous that the suspension further comprises one or more stabilizing agent(s). Examples of stabilizing agents are the group of surfactants and emulsifiers.

To improve the durability and stability of the composite, the fluid phase advantageously has a low solubility for oxidants or interfering solutes, such as nitrates, silicates, bicarbonate, and cations.

In an embodiment of the disclosure, the one or more fluid(s) are selected from the group of: water, aqueous based solvents, oil based solvents, and any combination thereof.

To facilitate the injection of the suspension into a contaminated media, the viscosity of the suspension is advantageously low. The higher the solid load of particles, i.e. the higher the ratio of solids to fluids, the higher the viscosity. Further, to improve the uniform dispersion of the particles within the fluid phase, and to minimize the risk of sedimentation of the solids, the solid load is advantageously low.

In an embodiment of the disclosure, the suspension has a solid load between 0.001 to 50 wt %, more preferably between 0.01 to 30 wt %, or between 0.1 to 20 wt %, and most preferably between 0.5 to 10 wt %, or between 1 to 5 wt %.

Composite

The composite of the present disclosure comprises a green rust (abbreviated as "GR") and a carbon composition, wherein the carbon composition comprises phosphorus (P) and is obtained by pyrolysis. Thus, advantageously the carbon composition comprises, or is, biochar. The composite was seen to have a surprisingly high reducing power, such as a surprisingly high reaction rate for dehalogenation. The efficient dehalogenation is related to the combined reducing power and catalytic property of the composite, where the reducing power of GR (green rust) is associated with the oxidation of Fe(II) to Fe(III) oxides.

By the term "composite" is meant a material made of two or more materials, and where the two or more materials have different properties. The two or more materials may be incorporated or integrated with each other in different ways. For example both materials may be in the form of powder, i.e. consisting of particles or particle agglomerates, and the composite is thus an aggregate of the two types of powder particles. A composite may also be a "molecular composite", where individual molecules of the two types of materials are assembled in a liquid phase, thus forming particles on the molecular scale.

Both GR and the carbon composition are easy to manufacture at large-scale and are cheap resources, and may even be waste products. For easy and safe fabrication of the composite, the composite is advantageously in the form of a powder, and comprises particles or agglomerates of GR and the carbon composition. Higher reactivity, and thus more efficient remediation, may be obtained the smaller the particle or agglomerate size of composites and GR and carbon particles. This is because the reduction kinetics of the composite may depend on the exposed surface area of the composite that may be in contact with the contaminated media. Thus, the larger the relative surface area of composite, the more efficient the composite will be. Thus, advantageously, the composite is shaped as particles or agglomerates of smaller size.

In an embodiment of the disclosure, the composite is in the form of particles or agglomerates having a size between 1 nm to 1000 µm, more preferably between 50 nm to 500 µm, or between 100 nm to 100 µm, and most preferably between 200 nm to 1 µm.

In an embodiment of the disclosure, the GR (green rust) particles or agglomerates have a size between 1 nm to 5 µm, more preferably between 100 nm to 3 µm, or between 500 nm to 1 µm, and most preferably is ca. 1 µm.

In an embodiment of the disclosure, the carbon composition particles or agglomerates have a size between 1 nm to 500 µm, and more preferably between 500 nm to 300 µm, or between 1 µm to 200 µm, and most preferably is ca. 100 µm.

The reactivity of the composite, and the efficiency of the remediation, will further depend on the composite composition, i.e. the ratio between the GR (green rust) and carbon composition. Example 7 shows the removal or remediation efficiency for different composite compositions, and it was seen that the higher carbon composition loadings resulted in more efficient composites and contaminant removal.

In an embodiment of the disclosure, the composite comprises at least 5 wt % of carbon composition(s) or biochar, more preferably at least 10, 20, 30, 40, or 50 wt % of carbon composition(s) or biochar. In another embodiment, the weight ratio between the carbon composition(s) and the GR (green rust) compound(s) is 5:95, and more preferably is: 10:90, 20:80, 30:70, 40:60, or 50:50.

The reduction kinetics, or the efficiency of the composite for the remediation, are further seen to depend on the type of GR, the type of carbon compositions, as well as the composition and microstructure of the composite.

Green Rusts (GRs)

Green rusts are defined as iron hydroxides, and are further defined as layered double hydroxide (LDH), which comprises iron in both divalent and trivalent state. Thus, GR (green rust) may also be referred to as LDH (layered iron hydroxides), or Fe(II)-Fe(III)-LDH. The GR structure consists of hydroxide layers of divalent Fe(II) or $Fe^{2+}$, and trivalent Fe(III) or $Fe^{3+}$ metal ions in octahedral coordination, and intercalated with anions, such as sulphate, chloride or carbonate, between the metal hydroxide layers. Examples of a GRs (green rusts) include: iron hydroxysulphates, iron hydroxycarbonates, iron hydroxychlorides. Green rusts where the intercalated anion is not specified may be referred to as $Fe_2(OH)_5$. GRs can also be named as $GR_{Cl}$, $GR_{SO4}$, $GR_{CO3}$, $GR_{C12}$ according to the anion species in the interlayer of the GR structure. In the latter case C12 refers to dodecanoate anion.

GRs may be naturally occurring minerals, and may be synthesized in various ways. For example, GR may be synthesized via co-precipitation of iron salts, such as co-precipitation of iron(II) and iron(III) salts, or by (slow) oxidation of iron(II) solution under constant and/or controlled pH, or by glycine assisted methods, such as glycine buffered co-precipitation/oxidation, or by oxidation of solid $Fe(OH)_2$. Example 2 further describes a method for synthesizing GR. Furthermore, nano- to micrometer sized particles of GRs could be synthesized using co-precipitation method or partial oxidation of iron(II) solution at constant pH 7-8 under controlled atmosphere. Preferably, glycine can be added into the synthesis solution to facilitate fast and large scale synthesis of GRs. During GR synthesis, glycine can enable fast crystallization of GRs and avoid formation of impurities. After the synthesis, GRs can be separated and washed by deoxygenated water to remove salts and glycine. The GR product may be further freeze dried as powder or stored as aqueous suspension.

Faster reduction kinetics may be obtained for composites comprising certain GR (green rust) compounds, such as GRs with certain intercalated anions. Further, advantageous reduction kinetics may be obtained for GRs with a higher content of Fe(II).

In an embodiment of the invention, the composite comprises one or more GR (green rust) compound(s), wherein the ratio between Fe(II) and Fe(III) of at least one of the GR compound(s) is above 1:1, and more preferably is between 2:1 and 3:1.

In an embodiment of the invention, the intercalated anions of the GR compound(s) are selected from the group of: organic and inorganic anions, and more preferably are selected from the group of: anionic surfactants, carbonate ($CO_3^{2-}$), chloride (Cl), sulfate ($SO_4^{2-}$), fluoride ($F^-$), and any mixtures thereof. In a further embodiment, the GR compound(s) are selected from the group of: iron hydroxysulphates, iron hydroxycarbonates, iron hydroxychlorides, and any mixtures thereof.

Example 8 shows that faster reduction kinetics may be obtained for composites comprising certain GR (green rust) compounds, such as GRs with certain intercalated anions, and slower kinetics may be obtained for green rusts with intercalated sulphate ($SO_4^{2-}$). In a preferred embodiment of the invention, the intercalated anions of the GR compound(s) are selected from the group of: anionic surfactants, carbonate ($CO_3^{2-}$), chloride ($Cl^-$), fluoride ($F^-$), and any mixtures thereof. In a further preferred embodiment, the intercalated anions of the GR compound(s) are chloride (Cl).

Example 9 shows that slow reduction kinetics are obtained for composites comprising only Fe(II) and no green rusts.

Advantageously, the green rust compound(s) are obtained by oxidation of green rust precursors, such as iron (II) hydroxide $Fe(OH)_2$. The oxidation will occur spontaneously for a composite under atmospheric conditions, Thus, composites comprising green rust compounds, or the corresponding green rust precursor(s), will show the same surprisingly fast reduction kinetics for environmental remediation. Thus, the composite may alternatively initially comprise one or more green rust precursor(s).

In an embodiment of the disclosure, the green rust precursor(s) comprises iron (II) hydroxide $Fe(OH)_2$.

Example 15 shows an embodiment of a composite comprising a green rust precursor and acid treated bone char for TCe degradation.

Carbon Composition

By the term carbon composition comprising phosphorus and/or nitrogen, and/or sulphur, and/or oxygen, and/or hydrogen, is meant a compound, or a composition or mixture, comprising carbon and phosphorus, and/or nitrogen, and/or sulphur, and/or oxygen, and/or hydrogen, such as mainly carbon and a minor amount of phosphorus (P) and/or nitrogen (N) and/or sulphur (S), and/or oxygen, and/or hydrogen. The phosphorus and/or nitrogen and/or sulphur, and/or oxygen, and/or hydrogen, may be present as a dopant, for example as in P-doped graphite, N-doped graphite, or S-doped graphite. In addition, or alternatively, the phosphorus and/or nitrogen and/or sulphur may also be present in elemental form, such as elemental phosphorus, also known as "black phosphorus" in a mixture with a carbon material, for example as in a mixture of graphite and elemental phosphorus.

The carbon composition is advantageously obtained by pyrolysis. By the term "pyrolysis" is meant a decomposition process of organic material at elevated temperatures and in the absence of oxygen.

Further advantageously, the carbon composition is biochar, where biochar is made from pyrolysis of biomass. Thus, biochar is a carbon composition obtained by pyrolysis, which inherently will comprise phosphorus, and/or nitrogen, and/or sulphur, and/or oxygen, and/or hydrogen.

Further advantageously, the higher the pyrolysis temperature, the more efficient the composite or the faster the reduction kinetics. Example 3 describes an embodiment of improved reduction kinetics, or remediation, for composites comprising carbon compositions obtained at different pyrolysis temperatures.

In an embodiment of the invention, the carbon composition(s) or biochar(s) are obtained by a pyrolysis process carried out at a temperature above 300° C., more preferably above 400, 500, 600, 700, 800, 900, or 1000° C.

Efficient reduction kinetics may be obtained when the resulting carbon composition after the pyrolysis is in certain forms. For example, the resulting carbon composition may be in the form of graphene, graphite, and/or char. Particularly fast reduction kinetics may be obtained with char, thus preferably the carbon composition comprises char.

By the term "char" is meant the solid product obtained from a pyrolysis process.

Different types of char may be obtained depending on the original organic material that is being pyrolyzed. For example, charcoal may be produced by pyrolysis of typically wood, while biochar denotes a char produced by pyrolysis of any type of biomass. Thus, biochar is a solid carbon form made from pyrolysis of biomass. Depending on the source of the biomass, further different types of biochar may be obtained. For example, bone char is produced from animal bonemeal. Examples of biochar includes: bone char, grass char, woodchips char, wood pellets char, and poultry litter char. Advantageously, the carbon composition is any charcoal produced by charring an organic substrate with a phosphorus rich material such as apatite.

In an embodiment of the disclosure, the carbon composition(s) or biochar comprise: graphene, graphite, and/or char. In a further embodiment, the carbon composition(s) are char(s), selected from the group of: charcoal, biochar, and combinations thereof. In a further embodiment, the char(s) are biochar(s) selected from the group of: bone char, meat char, shrimp char, anchovy char, sludge char, grass char, woodchip char, wood pellet char, poultry litter char, and any mixtures thereof, and preferably is bone char.

Surprisingly high reduction kinetics may be obtained for composites comprising GR and bone char. Bone char is also abbreviated and referred to as "BC". Examples 1-2 further describes an embodiment of a GR-bone char composite, where surprisingly fast dechlorination was obtained.

To obtain the surprisingly fast reduction kinetics, the carbon composition must be obtained by pyrolysis, and comprise phosphorus, and/or nitrogen, and/or sulphur, and/or oxygen, and/or hydrogen. Example 5 describes comparative experiments, where composites comprising $GR_{Cl}$ combined with carbon and/or phosphorus compositions that are not obtained by pyrolysis (i.e. carbon apatite/tricalcium phosphate, and/or black carbon, and/or a softer carbon humic-type material). Much lower reduction, or remediation, kinetics was observed. Thus, advantageously, the carbon compositions comprise compounds that may be obtained by pyrolysis of char, such as bone char. Examples of a carbon composition obtained by pyrolysis is charcoal doped with phosphorus, and biochar doped with phosphorus, and elemental phosphorus. Further advantageously, the phosphorus content of the composite is within the range of phosphorus obtained by pyrolysis of bone char, e.g. between 0.001 to 40 wt %. Example 11 describes comparative experiments, for composites comprising GR combined with bio chars, where the carbon composition(s) comprise phosphorus, and/or nitrogen, and/or sulphur.

In an embodiment of the disclosure, the carbon composition(s) or biochar(s) are selected from the group of: graphite doped with phosphorus and/or nitrogen and/or sulphur, and/or oxygen, and/or hydrogen, graphene doped with phosphorus and/or nitrogen and/or sulphur, and/or oxygen, and/or hydrogen, charcoal doped with phosphorus and/or nitrogen and/or sulphur, and/or oxygen, and/or hydrogen, biochar doped with phosphorus and/or nitrogen and/or sulphur, and/or oxygen, and/or hydrogen, and combinations thereof.

In a further embodiment, the composite further comprises elemental phosphorus and/or elemental nitrogen and/or elemental sulphur. In another embodiment, the content of phosphorus and/or nitrogen and/or is between 0.001 to 40 wt %, more preferably between 0.01 to 30 wt %, or between 0.1 to 20 wt %, or between 0.01 to 1 wt %, and most preferably between 1 to 10 wt %, or between 0.01 to 7 wt % or between 0.01 to 8 wt % of the biochar.

Advantageously, the bone char used in this invention may be bone char or other phosphorus enriched char pyrolyzed from different organic substrates including wastes and bio-wastes at different pyrolysis temperatures. Faster kinetics and more complete dehalogenation products may be achieved if the bone char is pyrolyzed at a temperature higher than 450° C., such as higher than 600° C., such as higher than 750° C., such as higher than 900° C., such as higher than 1050° C.

Higher pyrolysis temperatures may result in further charring of the animal bone material and/or other organic substrate, resulting in a higher degree of graphitization and less soft organic matter. Less soft organic material may be advantageous due to competitive adsorption to reactive sites. More carbonaceous black-carbon type material will enhance the overall electron transfer efficiency in the system and increase the rate of reduction of reducible pollutants. Furthermore, the higher temperature might produce specific phosphorus forms such as black phosphorus, as well as carbonaceous black-carbon materials doped with reactive phosphorus species that may offer excellent electron mediation and conductivity.

In an embodiment of the invention, the carbon composition or biochar is a graphitized material.

Figure 11:
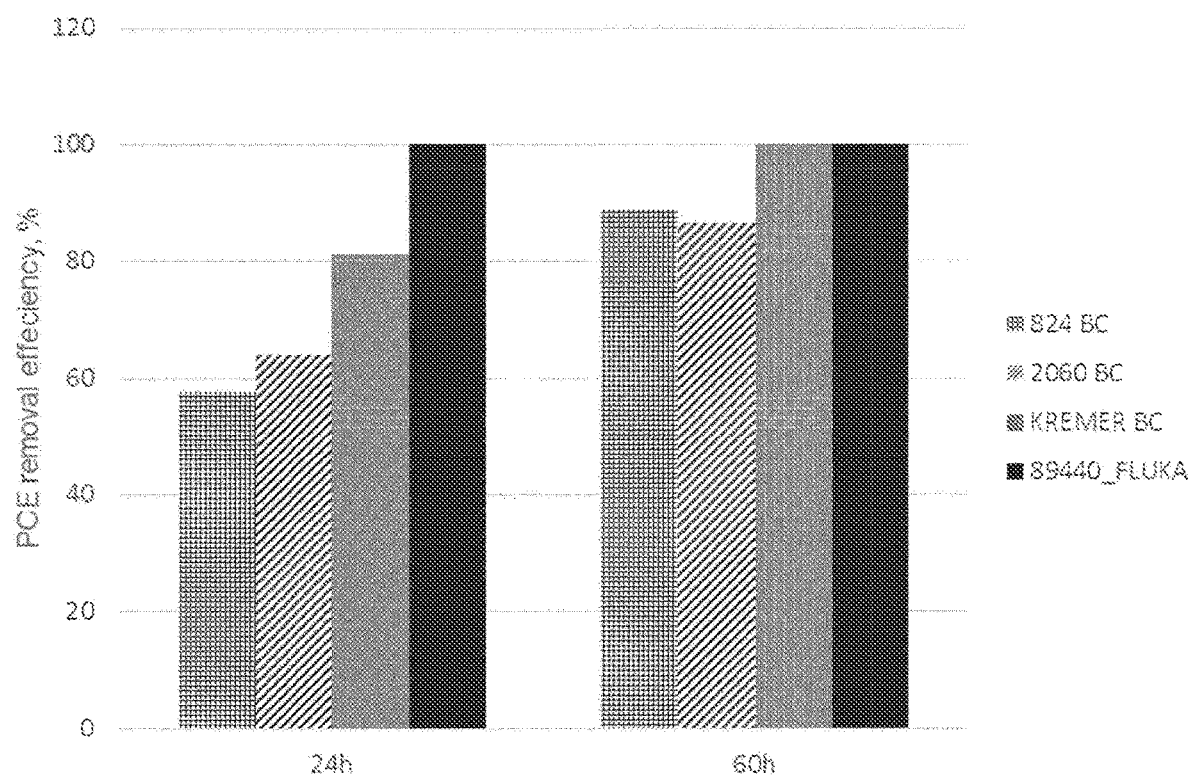
FIG. 11 shows data from Example 6. The figure shows the PCE removal efficiency for the composites prepared with bone char from different suppliers after respectively 24 and 60 hours contact with the composite.

The efficiency of the reduction kinetics, as well as the stability, of the composite may also be dependent on the supplier. For Example 4, FIG. 11 shows the PCE removal efficiency for the composites prepared with bone char from different suppliers after respectively 24 and 60 hours contact with the composite.

The efficiency of the reduction kinetics will depend on parameters such as the elemental composition of the biochar, and the structural properties of the composite. Example 13 summarizes the elemental composition of different biochars, in combination with the reduction efficiency and adsorption percentage. From the results it is indicated that faster reduction kinetics may be obtained for biochar carbon compositions with low crystallinity, and for biochar carbon compositions comprising phosphorus (P), and/or nitrogen (N), and/or sulphur (S), and/or oxygen (O), and/or hydrogen (H).

For example, surprisingly fast reduction kinetics may be observed for biochar carbon compositions with low crystallinity, such as non-crystalline, and/or amorphous, and/or nano-crystalline carbon compositions.

In an embodiment of the disclosure, the biochar(s) are non-crystalline, and/or amorphous, and/or nano-crystalline.

Further surprisingly fast reduction kinetics were observed for biochar carbon compositions comprises phosphorus, and/or nitrogen, and/or sulphur, and/or oxygen, and/or hydrogen. Advantageously, the biochar is a doped biochar, such as biochar doped with P, N, S, O, and/or H. Further advantageously, the oxygen is part of a functional group containing oxygen, such as a quinone group.

In an embodiment of the disclosure, the biochar(s) are selected from the group of: biochar doped with phosphorus and/or nitrogen and/or sulphur, and/or oxygen, and/or hydrogen, and combinations thereof. In a further embodiment, the biochar(s) comprises one or more functional group(s) containing oxygen, such as quinone group(s).

Further surprisingly fast reduction kinetics were observed for biochar carbon compositions comprising oxygen and/or hydrogen in certain amounts. For example the amount of oxygen in the biochar carbon composition or the composite is advantageously between 1-30 wt % of the biochar, and the amount of hydrogen in the biochar composition or the composite is advantageously between 0.01 to 5 wt % of the biochar.

In an embodiment of the disclosure, the oxygen content is between 1 to 30 wt %, more preferably between 2 to 30 wt %, and most preferably between 5 to 21 wt % of the biochar, In another and further embodiment, the hydrogen content is between 0.01 to 5 wt %, more preferably between 0.5 to 4 wt %, and most preferably between 0.5 to 3 wt % of the biochar.

Acid Treated Bio Char

Figure 14:
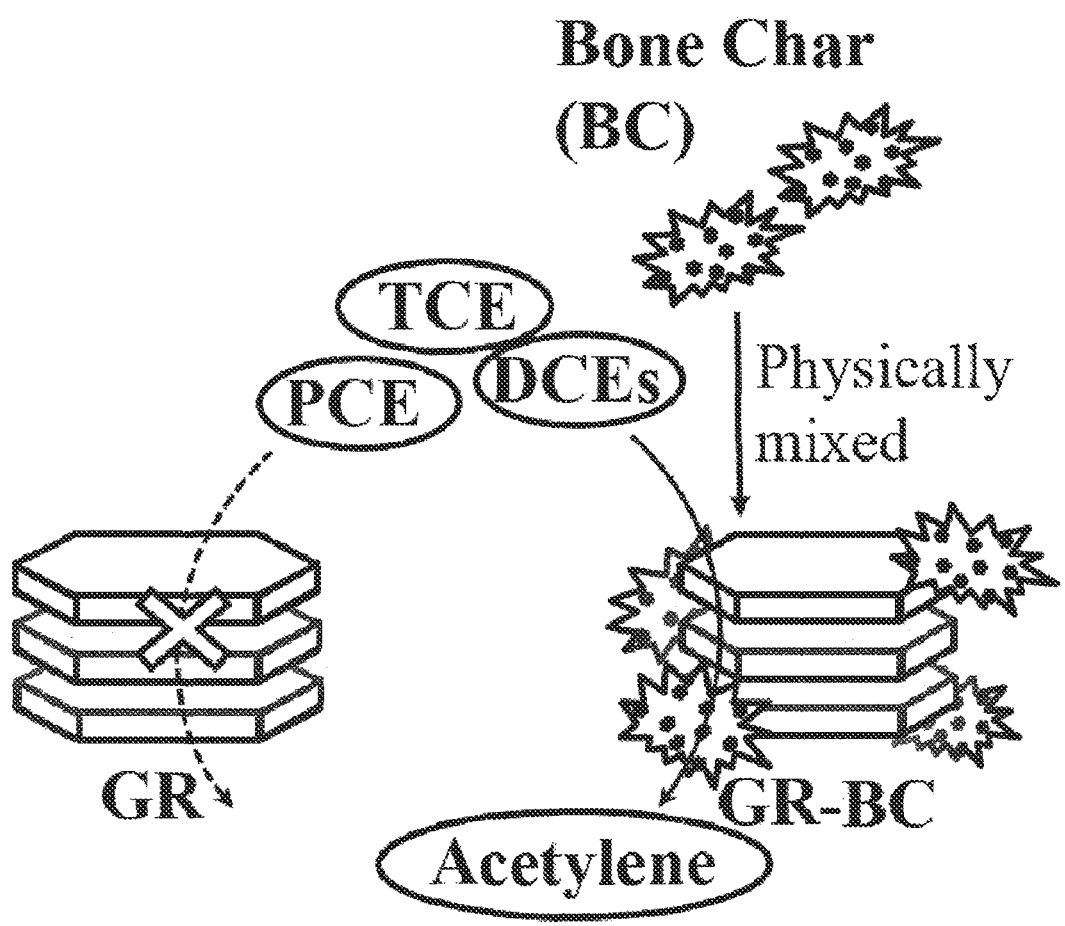
FIG. 14 shows an embodiment of the reduction of chlorinated solvents (TCE, PCE, DCEs) into acetylene, using respectively GR (left arrow), or (right arrow) a composite according to the present disclosure comprising physically mixed bone char (BC) and green rust (GR).

Different types of bio chars were tested as further described in Examples 11 and 12. It was surprisingly seen that for composites comprising green rust and carbon compositions obtained by pyrolysis, such as bio chars, surprisingly high reduction efficiency may be obtained. The effect is further illustrated in FIG. 14, showing the efficient reduction of chlorides (such as TCE, PCE, DCEs) into acetylene, when using the composite, e.g. obtained by physically mixing, bone char and green rust.

The efficiency of the composite may be further related to the type of carbon composition, and especially advantageous reduction kinetics may be obtained for pyrolysis carbon compositions comprising phosphorus, and/or nitrogen, and/or sulphur. For example, bone char is composed of 80-90% hydroxyapatite and 10-20% carbonaceous material. However, it is mainly the carbonaceous material which works as the mediator for the dehalogenation reactions, and not the apatite, as further described in Example 11.

In Example 11, the significance of the apatite component for dechlorination was tested. A composite made of 1.0 $g \cdot L^{-1}$ commercial hydroxyapatite ($Ca_5(OH)(PO_4)_3$) and the $GR_{Cl}$ slurry did not result in any TCE degradation over 30 days ruling out a direct catalytic role of apatite. Then, apatite was removed from the BC by digesting with 1 M HCl, leaving a black carbonaceous residue ($BC_{AT}$) amounting to ~15% of the original BC mass. XRD confirmed that the hydroxyapatite was removed in the $BC_{AT}$. The rate constants for TCE reduction normalized on the basis of carbon in the GR-BC and GR-$BC_{AT}$ were rather similar, 3.27 $h^{-1}$ $g^{-1}$ and 2.24 $h^{-1}$ $g^{-1}$, respectively. Thus, it is the carbonaceous component in the BC and not the hydroxyapatite or the combination of the two components that functions as the mediator in reduction of chlorinated ethylenes by GR. The GR structure was unaltered by mixing with BC or $BC_{AT}$ as seen from XRD patterns, demonstrating that neither phosphate from the apatite phase nor carbon material from the BC structurally interacts with the GR.

In Example 11, the GR-$BC_{AT}$ composite was further tested for TCE degradation in real groundwater contaminated with TCE at a concentration of 69±5 µM (9000±600 µg/L). Addition of the composite made of GR at ~2.6 $g \cdot L^{-1}$ and $BC_{AT}$ at 0.5 $g \cdot L^{-1}$ resulted in efficient TCE removal with a pseudo-first-order rate constant of 0.025±0.008 $h^{-1}$ ($t_{1/2}$=27.7 h) with acetylene as the only product. The rate constant is about 6.8 times lower than the rate constant for laboratory-spiked water ($k_{app}$=0.17 and $t_{1/2}$=4.04 h), and thus the reactivity of the composite was reduced in presence of a complex matrix as groundwater compared with laboratory spiked waters. The slower dechlorination in groundwater may be due to anions like bicarbonate and silicate in the groundwater that affects the GR reactivity and other organic solutes as well as oxidized contaminants that may compete for or poison sites on the carbonaceous material. The carbon mass balance calculated from the sum of TCE, all detected intermediates and products at each sampling interval was close to the TCE concentration in the control series over time with acetylene accounting for at least 85% of the total carbon mass involving TCE and reduced products. Small amounts of cis-DCE (max. 3.34% at 6th day) was produced as intermediate but disappeared after 12 days.

Advantages

An embodiment of the present disclosure relates to chemical reductants combining layered double iron hydroxides or iron-LDHs (green rusts, GRs) with bone char, more specifically with bone char pyrolyzed from animal's (e.g., cow) bone, offering fast kinetics and non-toxic degradation products during reduction of chlorinated solvents such as tetrachloroethene (PCE), trichloroethene (TCE), and dichloroethene (DCE) and other halogenated compounds. The present disclosure relates in particular to remove halogenated compounds from soil, sediment, wastewater, waste and natural waters.

Chlorinated solvents have been intensively applied as cleaning and degreasing reagents for electronics and for cleaning of clothing (dry-cleaning reagents) because they are good organic solvents, and because they are nearly nonflammable and noncorrosive. Chlorinated solvents have low water solubilities, they are heavier than water and they have appreciable vapour pressures. When these toxic compounds are released to the environment, they may penetrate deeply into soils and sediments and persist as free phases—so-called dense non-aqueous persistent liquids (DNAPLs). The high degree of chloro-substitution makes the compounds long-lived. The most commonly found chlorinated solvents in soil and groundwater systems are tetrachloroethene (or perchloroethene, PCE), trichloroethene (TCE), carbon tetrachloride (CT) and their natural degradation or progeny products. The existence of chlorinated solvents in soil, groundwater and sediments poses a great threat to human health because they are carcinogenic. Also the compounds may evaporate from polluted sites and penetrate into housing located on top of the polluted sites. Less halogenated compounds are usually less toxic, with vinyl chloride (VC) as a notable exception. The fully dehalogenated compounds are comparatively much less toxic than the halogenated precursors, and they are easily biodegradable.

There are many both off-site and in situ technologies used for remediation of soils and waters contaminated with chlorinated solvents, including thermal, pump-and-treat, oxidative, and microbial degradation methods. However, among the most popular procedures are reductive dehalogenation in which strong reductants reduce the chlorinated compounds to less or non-chlorinated compounds that are non-toxic and readily biodegradable. Iron based materials such as zero-valent iron (ZVI), iron sulfides, magnetite and iron-LDHs (green rusts, GRs) have been considered as efficient reductants to transform reducible pollutants such as nitrate, chromate, selenate, nitro-aromatics and chlorinated alkanes/alkenes to non-toxic and/or non-available forms in environmental matrices.

Mainly ZVI and nZVI find extensive use as reducants for soil and groundwater remediation. Use of ZVI in permeable reactive barriers and nZVI for injection into polluted zones has been commercialized at larger scale. Production of nZVI usually involves the use of strong reductants such as $NaBH_4$, heating process and/or milling processes, which are costly. Also the ZVI particles may be doped by other metals, such as noble or transition metals, which may themselves constitute environmental pollutants. Furthermore, for the removal of chlorinated solvents using ZVI, the dechlorination products may not be fully dehalogenated and DCE may accumulate in the environment.

Because of the cost and disadvantages of using ZVI for environmental remediation, alternative reductants for dehalogenation are being sought, particularly for the degradation of chlorinated solvents. Iron(II)-containing solids would be an obvious choice since these materials are relatively cheap and possess excellent reducing capacity towards various reducible pollutants such as chlorinated solvents. A promising iron-containing solid to be used for dehalogenation should match at least three criteria: 1) excellent reactivity based on a large surface area (reactive sites) and high iron(II) content; 2) flexible structure that allows for surface modifications to modify the chemical-physical and reactivity properties of the solid, e.g. through layer intercalation, coating and delamination; and 3) environmental friendly synthesis that is easy to upscale.

Green rusts are promising reductants to substitute ZVI. Green rusts are highly reactive iron(II)-bearing solids which can be used for dehalogenation of chlorinated solvents. The excellent reducing reactivity of GRs is attributed to the high content of iron(II) and the unique metal hydroxide layer with a high density of highly reactive and octahedrally coordinated iron(II)-iron(III) hydroxy pairs exposed at the solid-solution interface. Furthermore, GR properties can be easily modified by use of their ion exchange properties and double layer structure, so for instance to allow for dispersion in DNAPL phases by intercalation of anionic surfactants into the GR interlayer.

Up to now GRs have shown dehalogenation of carbon tetrachloride (CT) only, while dehalogenation of PCE, TCE, DCEs and VC seems to rarely occur or to proceed very slowly. Doping of GRs with metals such as Cu, Ag and Pd stimulates dehalogenation of chlorinated ethenes to a certain extent, but dehalogenation is still slow and incomplete. In addition, introduction of Cu, Ag and Pd into soils and groundwater would be costly and unsustainable. Therefore, cheap, sustainable and smart catalysts that can be combined with GRs is of great interests for dehalogenation of chlorinated solvents and other halogenated compounds.

An effect of the present invention is that the material combines the ideal chemical and physical properties of GRs and a carbon composition such as bone char (BC), i.e. a stable GR structure with a high reducing capacity combined with the binding affinity for non-polar compounds and electron mediating properties of bone char. The composite of GR and bone char is also denoted "GR-BC". The present invention thus provides a material that has physical and chemical properties needed for the reductant to be used in environmental remediation, water treatment and even solid waste treatment. The composite of the present invention may be injected into the soil and aquifer or simply mixed with wastewater and solid waste to degrade the reducible halogenated pollutants.

Due to the presence of the carbon composition, which may include black carbon type carbonaceous material and phosphorus, the composite of the present invention may provide fast kinetics for dehalogenation of halogenated organic pollutants mainly attributed to enhanced sorption of the halogenated compounds and fast electron transfer from GR to these compounds.

A further advantage of the composite of the present invention is that when used for reduction of chlorinated ethenes is to avoid the formation and accumulation of chlorinated intermediates such as DCE and VC, as the reductive dehalogenation pathway produces acetylene with little formation of intermediates. The carbon composition, such as bone char, of the composite of the present invention is thought to interact with dehalogenation intermediates via protonisation/deprotonisation, thus switching the pathway from hydrogenolysis to β-elimination favoring acetylene formation.

A further effect of the invention is that the composite of the present invention with its load of phosphate and carbon can be used as a nutrient source and growth substrate, and hence stimulate microbial growth and bioremediation in later stages of remediation when toxic chlorinated ethenes have been removed. Bone char contains abundant hydroxyapatite or tricalcium phosphate which is a source of phosphate for microbial growth.

Advantageously, the composite of the present invention can be formulated into a slurry fluid, where the fluid could be aqueous liquid or emulsified liquid which can be injected into an aquifer and mixed with contaminated soil, waste water and other solid wastes such as slag and sludge.

EXAMPLES

The disclosure is further described by the examples provided below.

Example 1: Experimental Setup for Testing Remediation of Chlorinated Ethylene Solvents The experiments were performed using analysis of headspace above the reactive mixture of chlorinated ethenes exposed to GR-bone char (BC) composites.

Quantification of chlorinated ethenes and dehalogenated products in the headspace was performed using a GC chromatograph, where the GC-MS system consisted of a Thermo TRACE GC 1300 gas chromatograph with Triplus300HS headspace injector coupled to dual detectors of EDC and FID. A PoraBOND U column (25 m×0.35 mm×7 μm) was used with 1.2 mL min$^{-1}$ nitrogen as carrier gas.

The oven temperature program was as follows: 40° C. (2 min), 25° C. min$^{-1}$ to 220° C. (2 min). Samples were incubated for 0.5 min at 40° C., after which 200 μL gas samples was injected with a split ratio of 50 and at an injector and syringe temperature of 85° C.

The ECD detector was set at 280° C. with makeup gas flow at 15.0 mL min$^{-1}$. The ECD detector was set at 300° C. with air flow at 350 mL min$^{-1}$, hydrogen flow at 40.0 mL min$^{-1}$ and makeup gas flow at 39.0 mL min$^{-1}$. External calibration was carried out using equilibrated headspace standards prepared in 10 mL GC vials, which contain 10 mL headspace and 10 mL solution spiked with the chlorinated ethenes.

Example 2: GR-Bone Char Composite for Dehalogenation of Chlorinated Ethenes

The dehalogenation kinetics of different chlorinated ethenes in solvents were examined upon contact and exposure to composite comprising GR (green rust) and bone char according to the disclosure. The experimental setup was as described in Example 1.

The composite was made from mixing a green rust $GR_{Cl}$ and a bone char (89440_FLUKA).

The GR compound may be synthesized by co-precipitation of iron salts, by oxidation of iron(II) solution under constant pH, by a glycine assisted method, or by oxidation of solid $Fe(OH)_2$.

A mixture was prepared of 7.4 g/L $GR_{Cl}$ (corresponding to 11 mM of Fe(II) in $GR_{Cl}$), 1 g/L bone char, and chlorinated ethenes with an initial concentration of ca 20 μM (in total 0.1 μmol in the head space vial), and an initial pH 8.0. Alternatively, a mixture was prepared of 3.2 g/L $GR_{Cl}$ (corresponding to 22 mM of Fe(II) in $GR_{Cl}$). The mixture was shaken at 300 rpm at room temperature. The chlorinated ethenes were respectively PCE, TCE, cis-DCE, trans-DCE, and vinyl chloride (VC).

Figure 2:
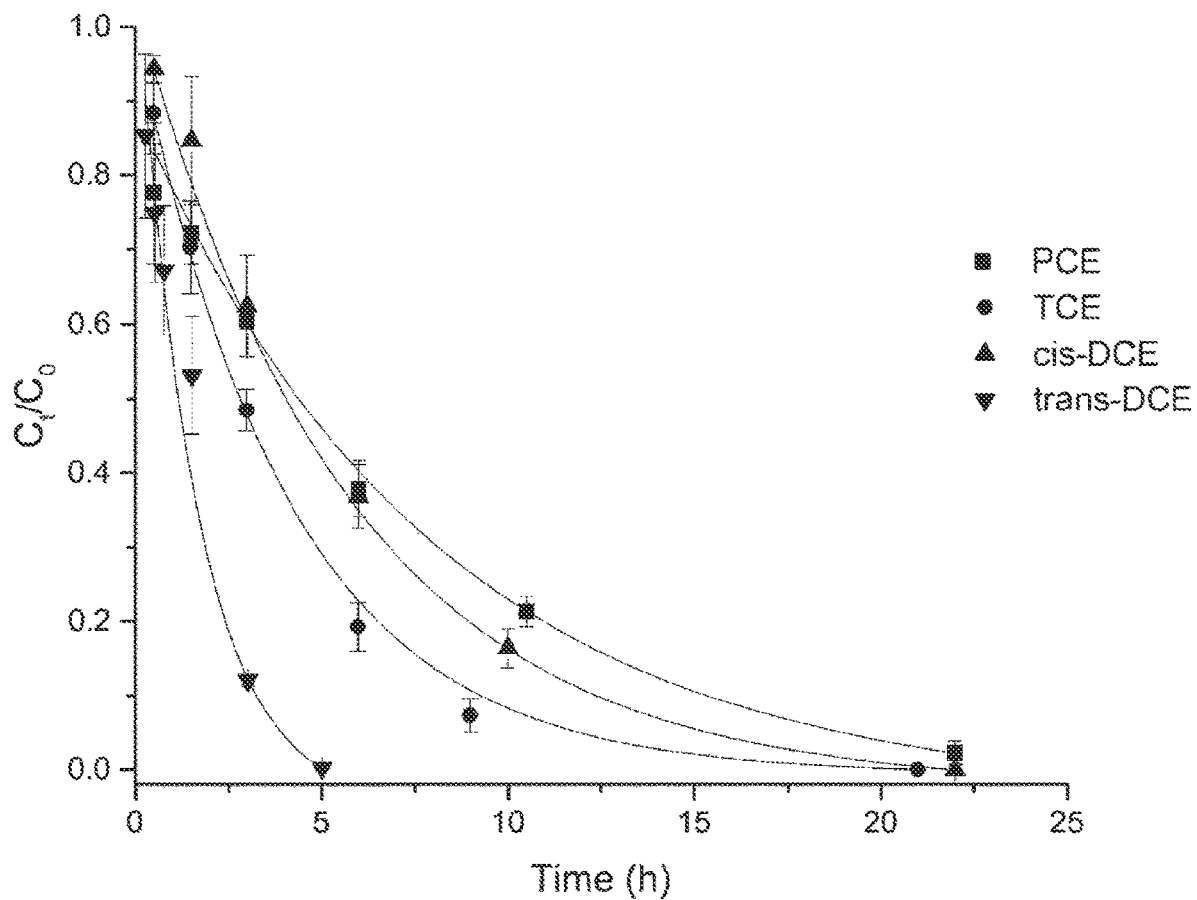
FIG. 2 shows data from Example 2. The figure shows the concentrations of the chlorinated ethenes normalized to the initial concentration ($c_t/c_0$) as a function of time in contact with a GR-bone char composite embodiment according to the invention. Error bars represent the standard deviation (n=3), and solid lines are based on first order fittings. The concentration of PCE is shown with square symbols, TCE with circles, cis-DCE with triangles where the apex points up, and trans-DCE with triangles where the apex points down.

FIG. 2 shows the concentrations of the chlorinated ethenes normalized to the initial concentration ($C_t/C_0$) as a function of time in contact with the composite. Error bars represent the standard deviation (n=3), and solid lines are based on first order fittings. The concentration of PCE is shown with square symbols, TCE with circles, cis-DCE with triangles where the apex points up, and trans-DCE with triangles where the apex points down.

For the chlorinated ethenes, almost 100% of the added PCE, TCE and cis-DCE were removed or remedied within 24 hours. Further, a much faster removal of trans-DCE was observed with 100% removal in 5 hours. Only for VC a slower removal rate was observed (not shown in FIG. 1). Thus, the composite was seen to result in highly efficient dehalogenation reactions.

Further, the reactions were seen to follow pseudo first-order kinetics with first-order rate constants for PCE, TCE, cis-DCE, and trans-DCE removal of 0.12, 0.27, 0.17 and 0.64 h$^{-1}$, respectively, corresponding to half-lives of 2.8, 2.0, 2.4 and 1.13 h. The kinetics data are summarized in Table 1a, including the apparent first-order rate constant ($k_{app}$), the half-lives of the first-order reactions ($t_{1/2}$), and the removal efficiency calculated as $(1-C_t/C_0)*100\%$, where t denotes the time at end of experiment.

The resulting products of the dechlorination processes with the composite were also examined. The main products for the different chlorinated ethenes are included in Table 1a as percentage of the individual product among total amount of all products formed.

TABLE 1a

Summary of kinetics and products formed during dechlorination of chlorinated ethenes upon contact and exposure to a GR - bone char composite according to the disclosure[1].

| Chlorinated ethene | $k_{app}$[2], h$^{-1}$ | $t_{1/2}$[3], h | Sampling time, h | Removal efficiency[4], % | Product distribution[5] |
|---|---|---|---|---|---|
| PCE | 0.12 | 5.83 | 22 | 97.8 | Acetylene (77.5%) with small amount of methylacetylene (<7.40%) and trace amount of TCE, 1,1-DCE, trans-DCE and VC detected as intermediates |
| TCE | 0.27 | 2.57 | 22 | 95.1 | Acetylene (87.7%) without any detectable intermediates |

TABLE 1a-continued

Summary of kinetics and products formed during dechlorination of chlorinated ethenes upon contact and exposure to a GR - bone char composite according to the disclosure[1].

| Chlorinated ethene | $k_{app}$[2], $h^{-1}$ | $t_{1/2}$[3], h | Sampling time, h | Removal efficiency[4], % | Product distribution[5] |
|---|---|---|---|---|---|
| cis-DCE | 0.17 | 4.06 | 22 | 100 | Acetylene (83.9%) without detectable intermediates |
| trans-DCE | 0.64 | 1.11 | 5 | 100 | Acetylene(100%) without detectable intermediates |
| 1,1-DCE | / | / | 53 | 65.5 | Ethene (74%), ethane(4.2%) without detectable intermediates |
| VC | / | / | 53 | ~2.00 | Ethene (100%) |

[1]Experimental set-up: 7.4 g/L or 3.2 g/L $GR_{Cl}$, 1 g/L bone char (89440_FLUKA), initial pH 8.0, initial concentration of chlorinated ethenes ~20 μM, shaking at 300 rpm at room temperature.
[2]$k_{app}$, apparent first-order rate constant, $h^{-1}$.
[3]Half-life of first-order reaction, h.
[4]Removal efficiency = $(1 - C_t/C_0) * 100\%$.
[5]Distribution of individual products as percentage of initial amount of target chlorinated compound.

It was seen that using the composite for chlorinated ethene dehalogenation resulted in acetylene as the major final product for all reactions, and chlorinated intermediates such as DCE and vinyl chloride were rarely detected during dehalogenation.

Figure 3:
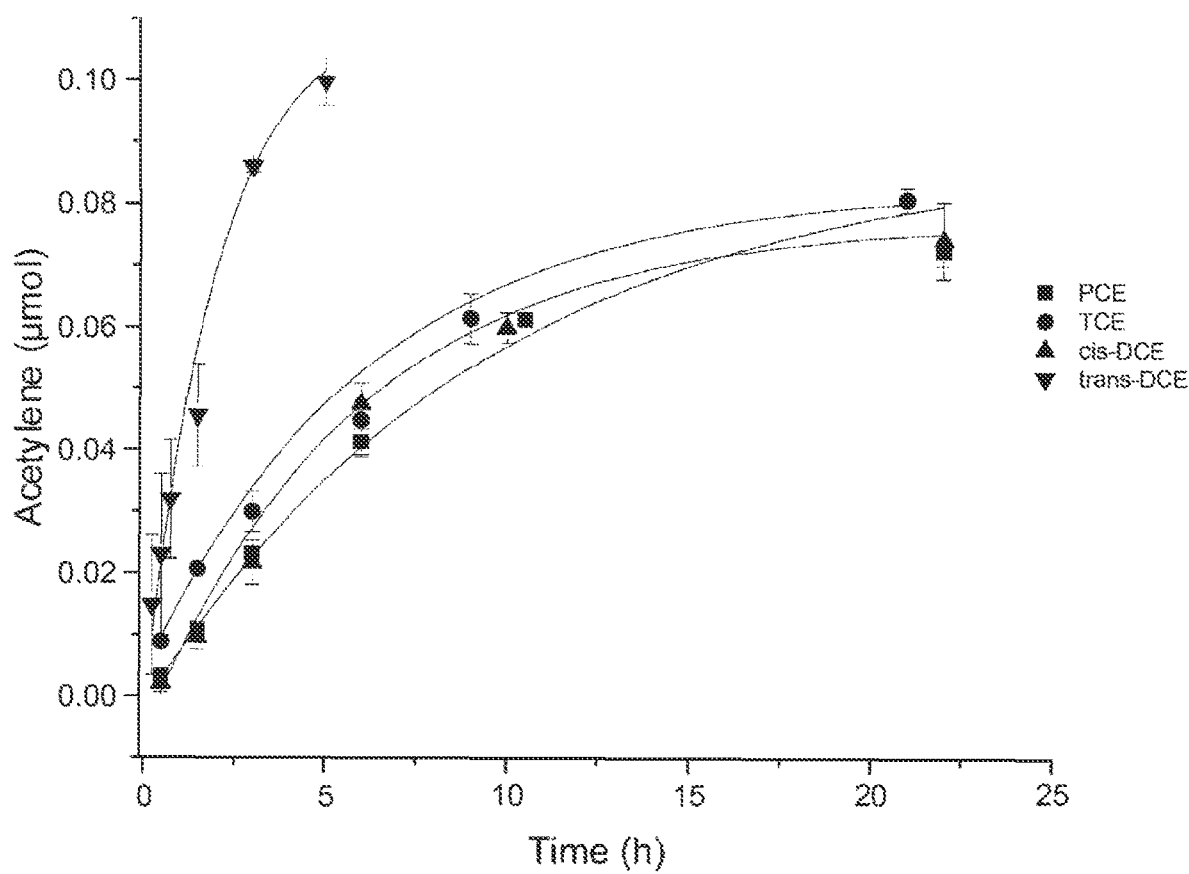
FIG. 3 shows data from Example 2. The figure shows the formation of acetylene in µmol as a function of time in contact with a GR-bone char composite embodiment according to the invention. Error bars represent the standard deviation (n=3), and solid lines are based on first order fittings. The concentration of acetylene, where the chlorinated ethane was PCE is shown with squares, TCE is shown with circles, cis-DCE with triangles where the apex points up, and trans-DCE with triangles where the apex points down.

FIG. 3 shows the formation of acetylene in μmol as a function of time for a number of different chlorinated ethenes in contact with the composite. Error bars represent the standard deviation (n=3), and solid lines are based on first order fittings. The concentration of acetylene, where the chlorinated ethene was PCE is shown with squares, TCE is shown with circles, cis-DCE with triangles where the apex points up, and trans-DCE with triangles where the apex points down. For all experiments a maximum of 0.1 μmol of acetylene could form per vial.

As for the kinetics of dehalogenation of the chlorinated ethenes, acetylene formation also follows first-order kinetics.

The measurements were repeated and the data are summarized in Table 1 b, where similar results were observed.

TABLE 1b

Summary of kinetics and products formed during dechlorination of chlorinated ethylenes by $GR_{Cl}$-BC composite for the experiments[a].

| chlorinated ethene | $k_{app}$[b], $h^{-1}$ | $k_{ace.}$[c], $h^{-1}$ | $t_{1/2}$[d], h | sampling time, h | removal eff.[e], % | product distribution[f] |
|---|---|---|---|---|---|---|
| PCE | 0.21 (±0.04) | 0.13 (±0.01) | 3.34 | 22 | 95.4 | Final products: Acetylene (95.0%) Intermediates: methylacetylene (≤14.1%), TCE (≤1.14%) |
| TCE | 0.17 (±0.04) | 0.13 (±0.02) | 4.04 | 21 | 95.0 | Acetylene (94.6%) without detectable intermediate |
| cis-DCE | 0.16 (±0.01) | 0.14 (±0.02) | 4.35 | 22 | 100 | Acetylene (100%) without detectable intermediate |
| trans-DCE | 0.39 (±0.09) | 0.37 (±0.09) | 1.79 | 5 | 99.8 | Acetylene (99.8%) without detectable intermediates |

[a]Experimental set-up: ~3.2 g·$L^{-1}$ $GR_{Cl}$, 1.0 g·$L^{-1}$ BC, initial pH 8.0, initial concentration of chlorinated ethenes 20 μM, shaking at 300 rpm at room temperature.
[b]$k_{app}$, apparent first-order rate constant.
[c]$k_{ace.}$, the first order kinetic constant of acetylene production.
[d]$t_{1/2}$, half-life of pseudo-first-order reaction, equal to $\ln2/k_{app}$.
[e]Removal efficiency = $(1 - C_t/C_0) * 100\%$, in which $C_t$ = total amount of target compound at t time, $C_0$ = that at t = 0.
[f]Distribution of individual products as percentage of total carbon mass.

Example 3: GR-Char Composite with Char Pyrolysed at Different Temperatures

Chars produced at pyrolysis temperatures from 300 to 1050° C. were tested for TCE dehalogenation.

The same experimental setup as described in Example 1 and Example 2 was used. The composite was prepared as described in Example 2, where the chars were respectively biochar produced by pyrolysis of corn straw at 400° C. (Corn BC400), and bone char produced by pyrolysis of bone meal at 300° C. (BC300), 450° C. (BC450), 600° C. (BC600), 750° C. (BC750), 900° C. (BC900), or 1050° C. (BC1050).

Figure 4:
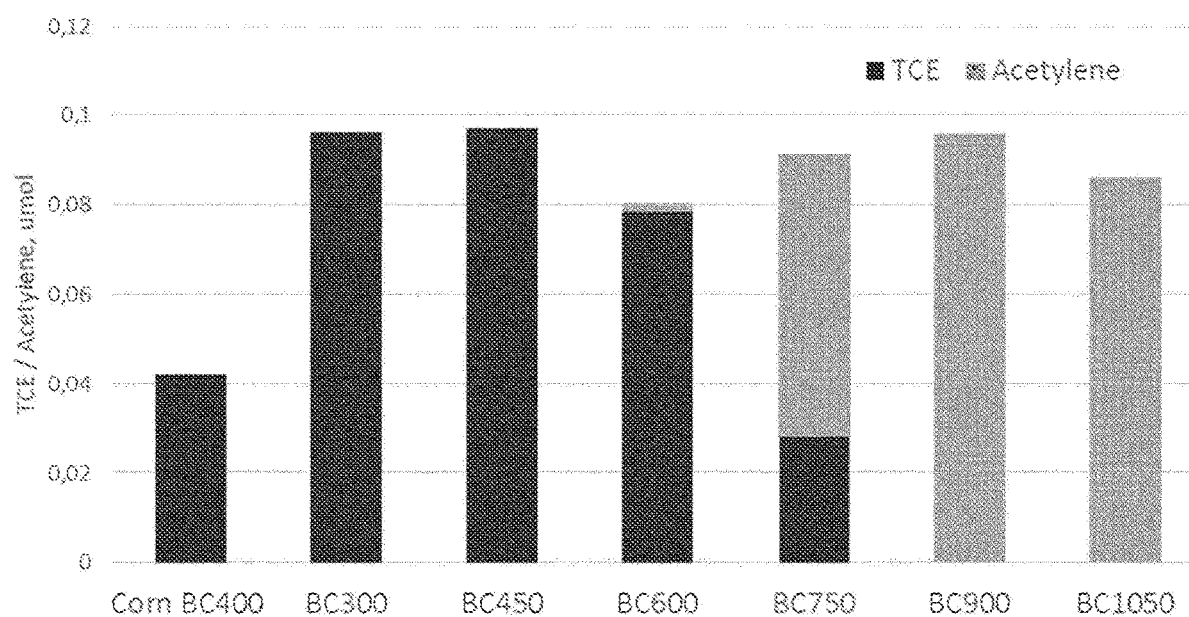
FIG. 4 shows data from Example 3. The figure shows the amount of residual TCE and acetylene formed after 24 h of contacting and reaction with a GR-char composite embodiment according to the invention, where the chars were respectively biochar produced by pyrolysis of corn straw at 400° C. (Corn BC400), and bone char produced by pyrolysis at 300° C. (BC300), 450° C. (BC450), 600° C. (BC600), 750° C. (BC750), 900° C. (BC900), or 1050° C. (BC1050).

FIG. 4 shows the amount of residual TCE and acetylene formed after 24 h of contacting and reaction with the composite per head space vial. Note that a maximum of 0.1 µmol of acetylene could form per vial.

It was seen that bone chars produced at higher pyrolysis temperatures resulted in faster TCE removal rates and more acetylene formation than bone chars produced at lower pyrolysis temperatures. When bone chars produced at pyrolysis temperatures higher than 750° C. were used, 100% of TCE was removed within 24 h and dehalogenation products were dominated by acetylene, while insignificant TCE removal was observed using bone chars produced at pyrolysis temperatures lower than 600° C., and for biochar from corn straw no removal rate was detectable.

Example 4: GR-Bone Char Composite/Suspension Stability

The stability of the composite was examined. The same experimental or instrumental setup as described in Example 1 was used.

The TCE dehalogenation removal efficiency for composites that were freshly prepared, and for composites that had been aged in aqueous suspension were examined. The freshly prepared composite was prepared as in Example 2. The examined aged composites were: a composite aged in water in an anaerobic chamber for 1 month after preparation (denoted "1-month-aged GR+BC"), and a composite of freshly synthesized $GR_{CI}$ mixed with bone char that has been aged in water in an anaerobic chamber for 2 months (denoted "GR+2-months-aged BC").

Figure 5:
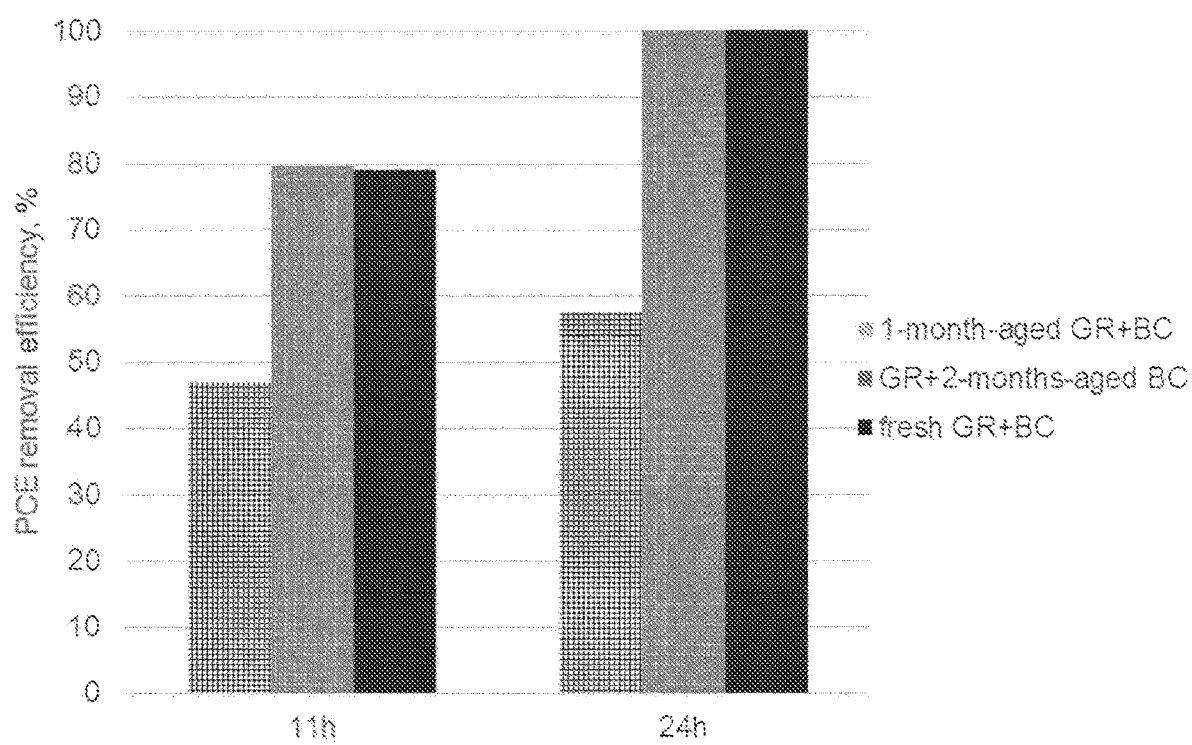
FIG. 5 shows data from Example 4. The figure shows the PCE removal efficiency of differently aged composites (fresh, 1-month-aged GR+BC, and GR+2-months-aged BC) after respectively 11 hours and 24 hours contact with the composite. The freshly prepared composite was an embodiment prepared as described in Example 2 and tested immediately thereafter. The examined aged composites were: a composite aged in water in an anaerobic chamber for 1 month after preparation (denoted "1-month-aged GR+BC"), and a composite of freshly synthesized $GR_{Cl}$ mixed with bone char that has been aged in water in an anaerobic chamber for 2 months (denoted "GR+2-months-aged BC").

FIG. 5 shows the PCE removal efficiency of the differently aged composites (fresh, 1-month-aged GR+BC, and GR+2-months-aged BC) after respectively 11 hours and 24 hours contact with the composite.

Figure 6:
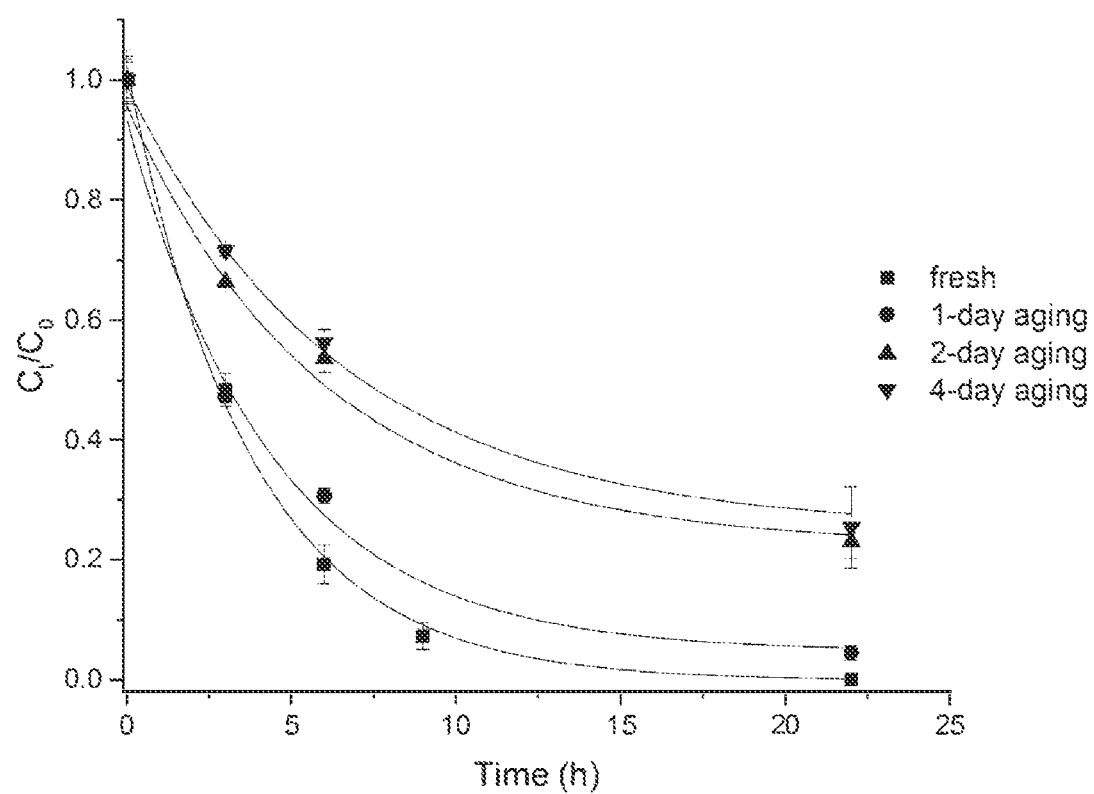
FIG. 6 shows data from Example 4. The figure shows the concentrations of the chlorinated ethenes (TCE) normalized to the initial concentration ($c_t/c_0$) as a function of time in contact with differently aged composites (i.e. fresh, 1-day aged GR+BC, 2-day-aged GR+BC and 4-day-aged GR+BC), thereby illustrating the decreasing reactivity towards TCE dechlorination with an increasing period of ageing.

FIG. 6 shows the reactivity of differently aged composites (fresh, 1-day aged GR+BC, 2-day-aged GR+BC and 4-day-aged GR+BC) towards TCE dechlorination. It is seen that with an increasing period of ageing, the reactivity decreased as expressed by the first-order kinetic constant (Table 2).

It was seen that the freshly prepared composite had the highest reactivity towards PCE dehalogenation since 100% of PCE was removed in 24 h.

The composite made by mixing freshly prepared $GR_{CI}$ with bone char stored for 2 months in aqueous suspension showed the same reactivity as the freshly prepared composite, and hence indicates that the bone char reactivity is not affected by storage in aqueous suspension.

For the composite aged for 1 month in aqueous suspension, a slower PCE removal rate was observed resulting in 58% PCE removal within 24 h compared with 100% for a freshly prepared composite. However, this removal rate is still considered high.

TABLE 2

Reactivity parameters of GR + BC composites aged for different time.

| Sample names | Sampling time, h | Removal efficiency, % | $k_{obs}$, h$^{-1}$ |
|---|---|---|---|
| Fresh | 22 | 100 (TCE) | 0.267 |
| 1 d-aging GR + BC | 22 | 95.6 (TCE) | 0.227 |
| 2 d-aging GR + BC | 22 | 77.0 (TCE) | 0.166 |
| 4 d-aging GR + BC | 22 | 74.7 (TCE) | 0.152 |
| 1-month-aged GR + BC | 24 | 57.4 (PCE) | —[1] |
| GR + 2-months-aged BC | 24 | 100 (PCE) | —[1] |

[1]Not determined as too few data to allow for first-order fitting.

Furthermore, it may be seen that $GR_{CI}$ alone in absence of bone char to a large degree would have lost its reactivity within 24 h due to structural destruction. Thus the results indicate that bone char stabilizes the $GR_{CI}$ structure against destruction, and thus maintains the reducing capacity of the composite for longer time. This stabilising effect of bone char will also result in a higher shelf-life of the composite suspensions.

Figure 7:
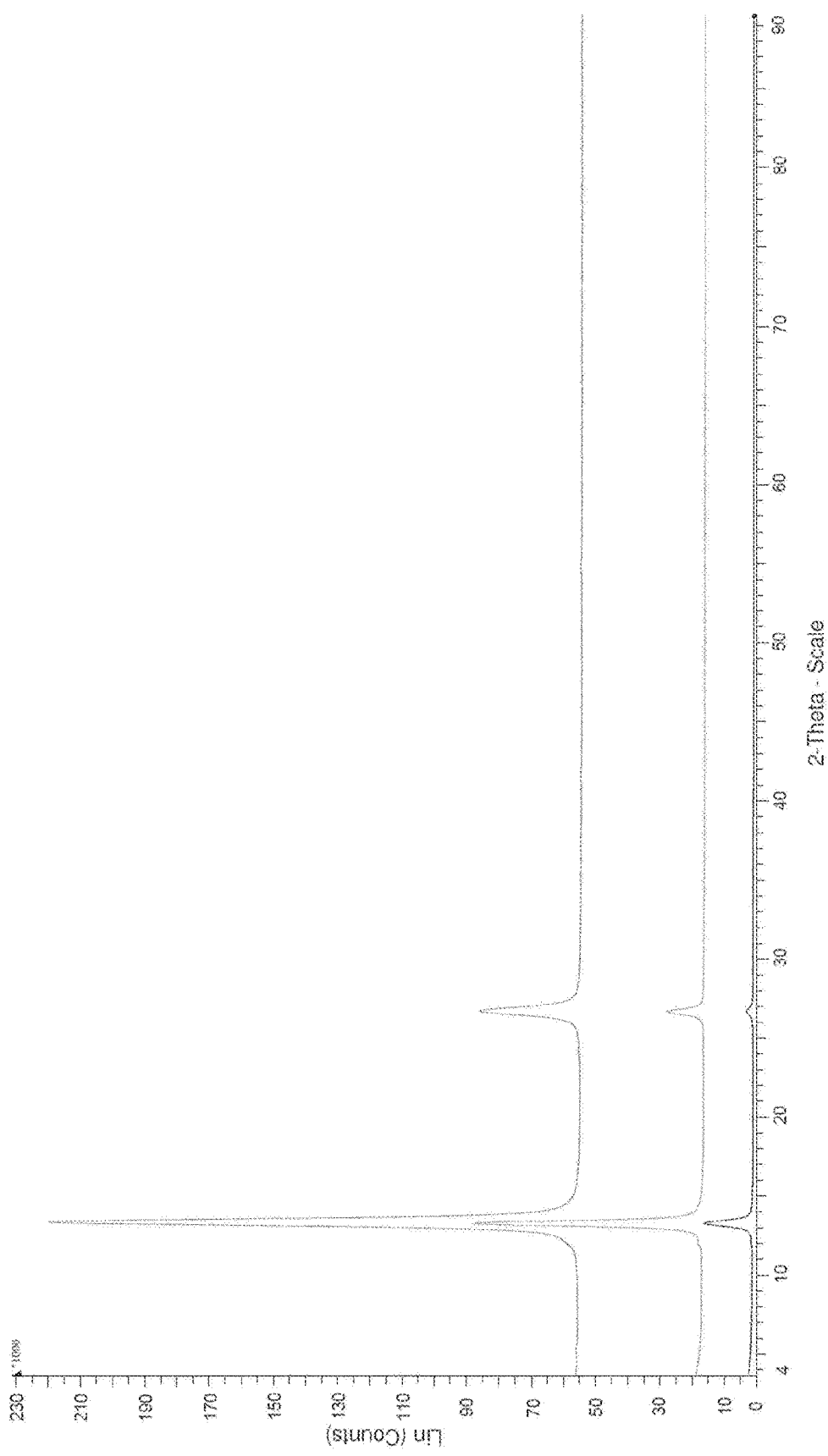
FIG. 7 shows data from Example 4. The figure shows the powder X-ray diffraction (XRD) patterns of freshly prepared $GR_{Cl}$, freshly prepared GR+BC composite and a 6-day aged GR+BC composite. Specifically.

FIG. 7 compares the powder X-ray diffraction (XRD) patterns of freshly prepared $GR_{CI}$, freshly prepared GR+BC composite and a 6-day aged GR+BC composite. Appropriate volumes of the suspensions were dropped onto 4×4 cm glass plates and allowed to dry in the anaerobic chamber. After drying, the samples were scanned at a rate of 0.2 degrees 2-theta per minute using Fe-filtered Co—K-alpha radiation. The sample denoted "GR_CI_fresh" was from a freshly prepared $GR_{CI}$ suspension, the sampled denoted "GRcI+1.0BC_fresh" was from a freshly prepared suspension of $GR_{CI}$ (7.4 g/L Fe(II) in $GR_{CI}$) added 1.0 g/L bone char (Fluka) or 3.2 g/L GR (22 mM Fe(II) in GR), while the sample denoted "GRcI+1.0BC 6d-aged" was from the same suspension but after ageing for 6 days in the anaerobic chamber (different amounts of material were added to the glass plates and hence intensities of the diffraction peaks cannot be used to estimate concentrations or quantities).

There are no shifts in location of reflections indicating that the GR+BC composite keeps the crystal structure of GR. The XRD trace also demonstrate that the BC is able to stabilise the GR against dissolution and that the crystallinity of the GR is maintained during ageing as no change in peak widths are seen in presence of the BC.

Figure 8:
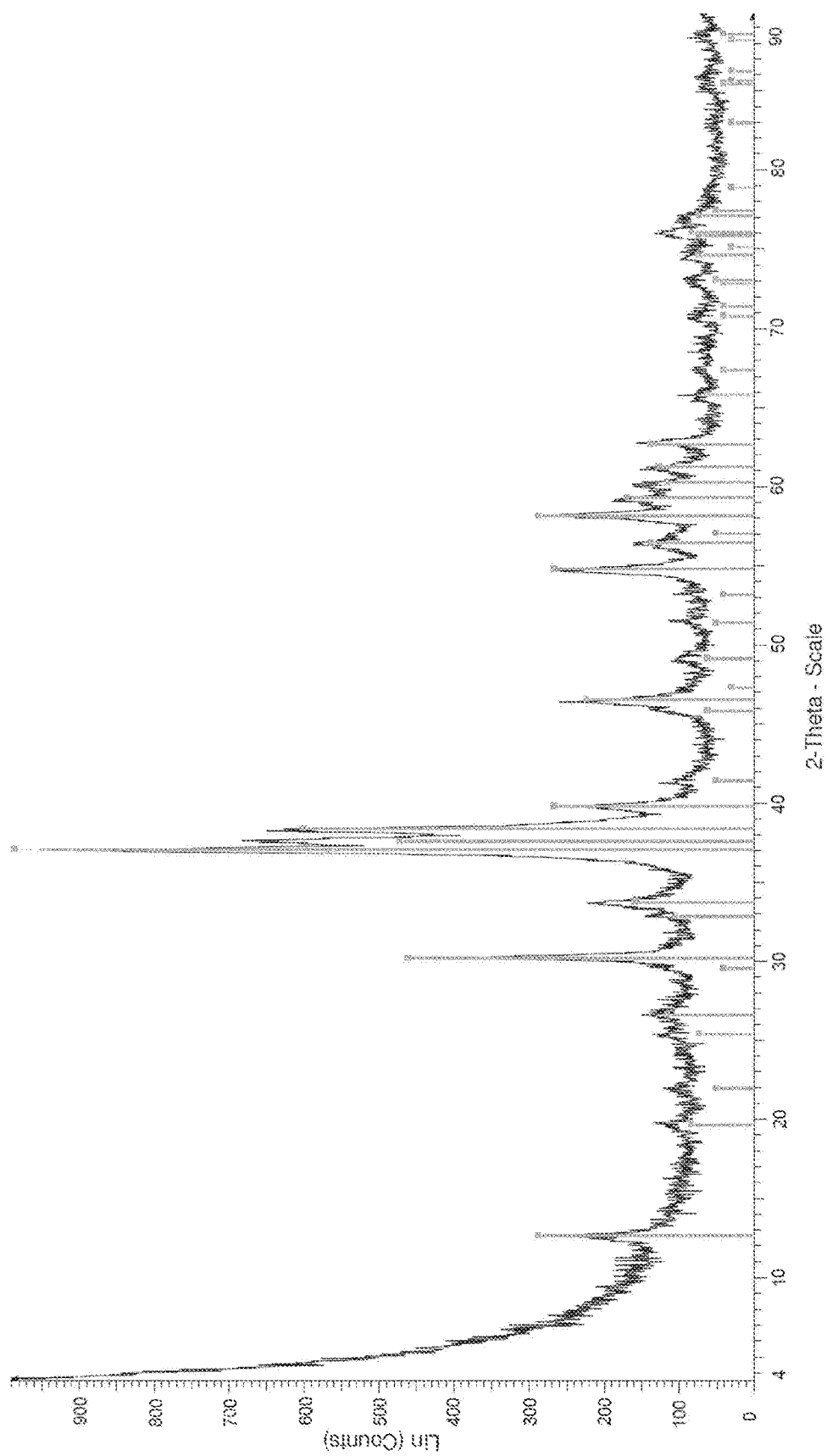
FIG. 8 shows data from Example 4. The figure shows the XRD pattern of bone char (Fluka) as the black curve, and with grey vertical lines overlay of the JCPDF reference for hydroxylapatite ($Ca_5(PO_4)_3(OH)$).

FIG. 8 shows the XRD pattern of bone char (Fluka) with clear reflections due to hydroxyapatite; the hydroxyapatite peaks are too weak to be seen in the GR+BC composite however (FIG. 7).

Figure 9:
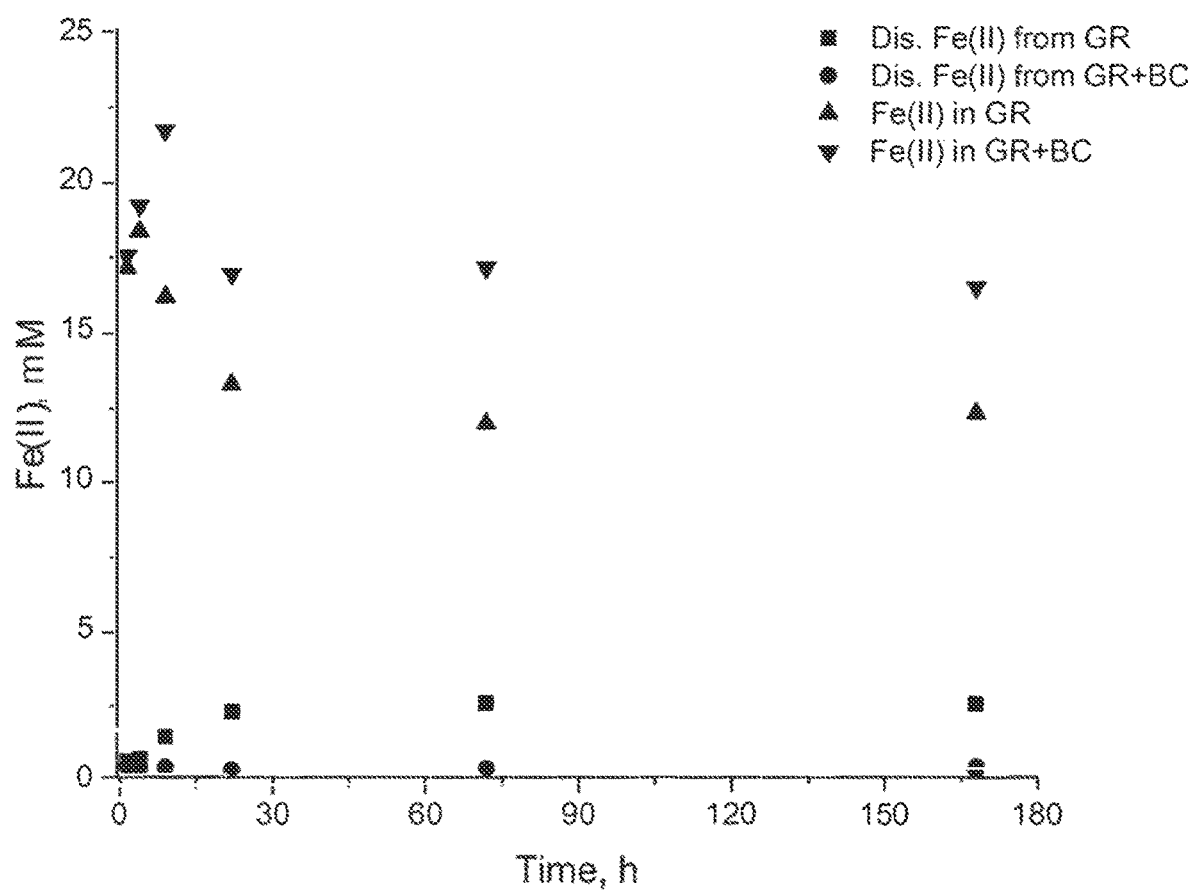
FIG. 9 shows data from Example 4. The figure shows the change in Fe(II) concentrations in solution ("Dis. Fe(II)" shown with squared and round symbols), and in the GR solid ("Fe(II)" shown with triangles), over time for $GR_{Cl}$ and $GR_{Cl}$+BC systems of Example 4.

FIG. 9 shows the change in Fe(II) concentrations in solution ("Dis. Fe(II) from . . . ") and in the GR solid ("Fe(II) in . . . ") over time for $GR_{CI}$ and $GR_{CI}$+BC systems described above. The same procedure as in Example 2 was followed, but with an initial concentration of $GR_{CI}$ of approximately 5.5 g/L or 2.4 g/L. Iron(II) was determined using the phenanthroline method; soluble Fe(II) was determined for the filtrate passing a 0.22 µm filter, while Fe(II) in the total suspension was determined after treatment of 1 mL suspension with 8 mL 0.1 M HCl for 15 min to dissolve all $GR_{CI}$. Iron(II) in GR (or composite) was found by difference between total for the suspension and Fe(II) in solution. It is seen that the Fe(II) distribution is stable after approximately 30 mins after mixing, and that the presence of BC results in a much lower Fe(II) concentration in solution and more Fe(II) in GR than for the pure $GR_{CI}$ system. These results and those shown in FIG. 7 demonstrates that bone char stabilizes the $GR_{CI}$ structure against dissolution, and thus maintains the reducing capacity of the composite for longer time. This stabilising effect of bone char will also result in a higher shelf-life of the composite suspensions.

Figure 10:
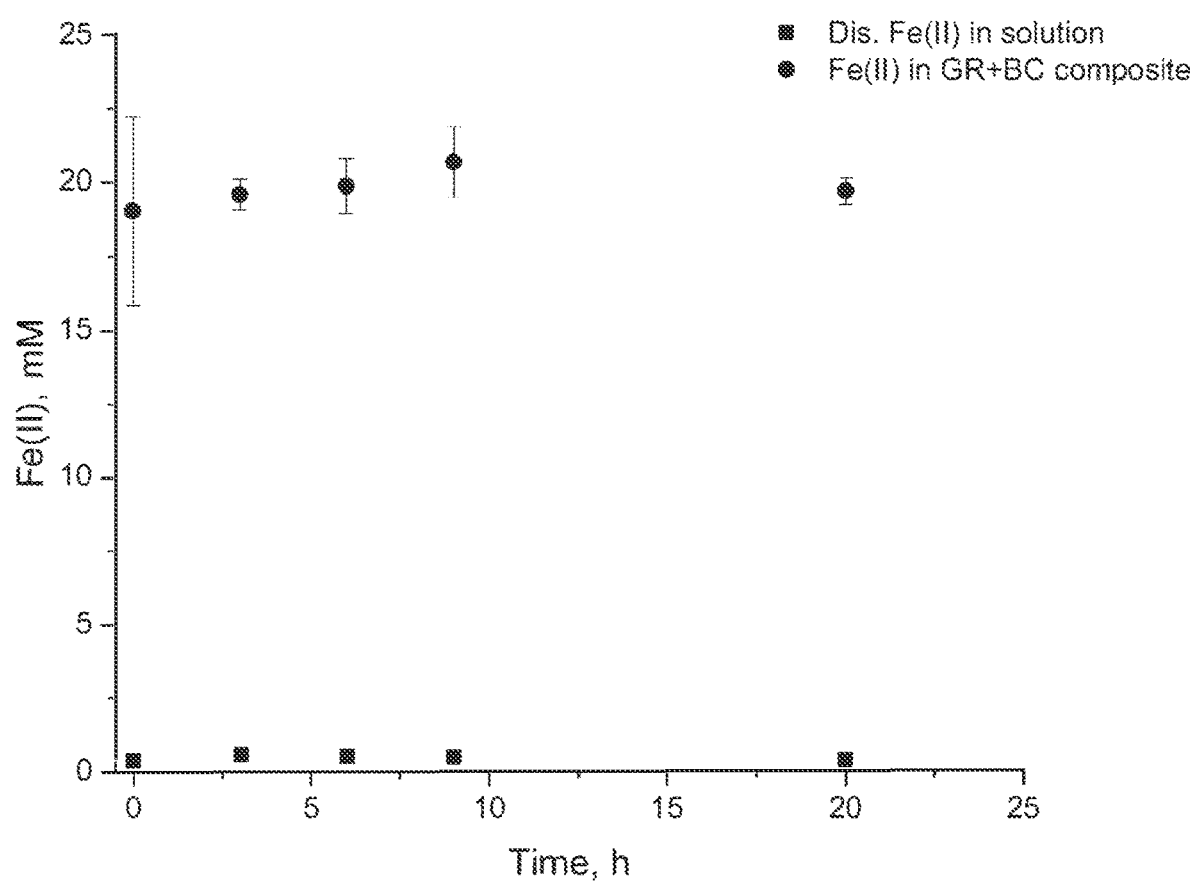
FIG. 10 shows data from Example 4. Similar to FIG. 9, the figure shows the change in Fe(II) concentrations in solution ("Dis. Fe(II)" shown with squared symbols), and in the GR solid ("Fe(II)" shown with circles), over time for the $GR_{Cl}$+BC system only, and with addition of 0.1 umol TCE.

FIG. 10 shows a similar experiment as in FIG. 9, but for $GR_{CI}$+BC system with addition of 0.1 umol TCE per head space vial. Also in this case the solubility of Fe(II) was very low in line with the almost unchanged Fe(II) content in the solids.

Example 5: Dehalogenation Using Activated Carbon, Hydroxyapatite and Humic Acids Dehalogenation of TCE was examined for composites comprising $GR_{CI}$ and apatite/tricalcium phosphate, and/or black carbon, and/or a softer carbon humic-type material. Apatite/tricalcium phosphate, black carbon, or a softer carbon humic-type material are the three major components in bone char, depending on the charing temperature. The composites were prepared as described in Example 2, and the results are summarized in Table 3.

No TCE dehalogenation could be observed in the reaction system without carbonaceous black carbon type material such as activated carbon. Nor could apatite-$GR_{CI}$ composites remove TCE ruling out that apatite alone together with GR facilitate the dehalogenation process (data not shown). The carbonaceous material may sorb TCE, and other chlorinated ethenes, as well as the products. Thus the overall TCE removal comprise both sorption and dehalogenation.

Recovery of the dehalogenation products presented in Table 2 show the extent of the dehalogenation reaction. The most reactive composite of those tested apart from the GR-bone char composite, is activated carbon combined with $GR_{CI}$ with 48% of TCE recovered as acetylene in 6 days. However, all the reactions shown in Table 3 are much slower than those using GR-bone char composites, demonstrating that the bone char combined with $GR_{CI}$ provides an optimal composite for dehalogenation of chlorinated ethenes.

TABLE 3

Summary of TCE dechlorination by different carbon composition materials mixed with 7.4 g/L $GR_{CI}$ at pH 8.0 with an initial dose of 20 µM TCE or 3.2 g/L GR (22 mM Fe(II) in GR).

| Materials | Carbon composition dose[1], g/L | Sampling time, d | Products recovery[2] | Product distribution[3] |
|---|---|---|---|---|
| Activated Carbon (AC)[4] | 1 g/L | 6 | 54.9% | Acetylene (88%), VC (10%), ethane (2.0%), ethene (0.48%), 1,1-DCE (0.11%) with trace of 1,1-DCE and cis-DCE detected as intermediates |
| Activated Charcoal Powder[5] | 1 g/L | 65 | 3.1% | Acetylene (100%) without detectable intermediates |
| Graphite[6] | 1 g/L | 7 | | No reaction |
| AC + humic acid[7] (HS) | 1 g/L AC 2 mg/L HS | 7 | 42.2% | Acetylene (93%), VC(5.0%), ethene (1.1%), methane (0.36%), cis-DCE (0.36%) with trace of 1,1-DCE |
| Hydroapatite[8] (HA) + AC | 0.85 g/L HA 0.15 g/L AC | 58 | 38.6% | Acetylene (81%), cis-DCE (13%), ethene (2.6%), 1,1-DCE (2.3%), ethane (0.89%), with trace of VC detected as intermediates |
| Tricalcium phosphate[9] (TP) + AC | 0.85 g/L TP 0.15 g/L AC | 58 | 24.2% | Acetylene (80%), cis-DCE (11%), 1,1-DCE (5.0%) and ethene (7.4%) |
| HA + AC + HS | 0.85 g/L HA 0.15 g/L AC 1 mg/L HS | 58 | 23.4% | Acetylene (79%), cis-DCE (16%), ethene (4.2%), ethane (0.73%), with trace of 1,1-DCE detected as intermediates |
| TP + AC + HS | 0.85 g/L TP 0.15 g/L AC 1 mg/L HS | 58 | 16.6% | Acetylene (83%), cis-DCE (14%) and 1,1-DCE (3.0%) |

[1]Mechanically mixed and kept for one day in the anaerobic chamber before use
[2]Products recovery indicates the TCE dehalogenation takes place, but most of the TCE was removed via adsorption by AC.
[3]Percentage of each product in total amount of all products
[4]Activated carbon powder
[5]Activated charcoal, puriss. p.a., Riedel-de Haën
[6]Graphite, synthetic, Aldrich, <20 µm
[7]Humic acid, techn., Fluka
[8]Nanopowder, <200 nm particle size (BET), ≥97%, synthetic, Aldrich
[9]Tricalcium phosphate hydrate, nanopowder, <200 nm particle size (BET), Aldrich Example 6: GR-Bone Char Composites with Bone Chars from Different Suppliers Composites made from $GR_{Cl}$ and bone chars from different suppliers were examined for PCE dehalogenation. The composites were prepared as described in Example 2, and tested as described in Example 1. Optionally the granular bone char (BC) has been grounded into powder by ball milling.

Table 4 shows an overview of the different bone chars tested. The specific surface area may be examined by BET measurements (Brunauer-Emmett-Teller) methods, from which average particle sizes or diameters may be inferred.

TABLE 4

Characteristics of bone chars from different suppliers.

| BC NAME | Commercial Supplier | Product name | solid status | Pyrolysis T, ° C. | pH |
|---|---|---|---|---|---|
| 89440_FLUKA | Aldrich | Bone charcoal | NA[1] | unknown | 8.5-10.0 |
| 2060 BC | Charcoal House LLC (BUY ACTIVATED CHARCOAL.COM) | Granular bone char 20 × 60 | ~12 μm | unknown | 8.0-10.0 |
| 824 BC | | Granular Bone char 8 × 24 | ~77 μm | | |
| KREMER BC | KREMER PIGMENTE | Bone Black | 50-300 μm | 400~800 | 9.0-11.0 |
| BC750/ BC900/ BC1050 | Made in the lab by charring cow bones at inert atmosphere at 750/900/1050° C. | — | NA[1] | 750/900/1050° C., respectively | NA[1] |

[1]NA: Information not available.

FIG. 11 shows the PCE removal efficiency for the composites prepared with bone char from different suppliers after respectively 24 and 60 hours contact with the composite. It was seen that composites with all tested bone chars can reduce PCE by at least 80% in 60 h.

FIG. 11 further shows that the bone chars from different suppliers resulted in different reactivity of the composites towards PCE dehalogenation. The efficiency and reactivity followed this order: 89440_FLUKA>KREMER>2060>824.

It was further seen that a composite of $GR_{Cl}$ combined with 89440_FLUKA bone char could remove 100% of PCE in one day.

Example 7: Reactivity of GR-Bone Char Composites with Different GR:BC Ratios

The TCE removal efficiency was examined for different composite compositions, i.e. different ratios between the GR and the BC (bone char). The composites were prepared in a similar manner as described in Example 2 (i.e. $GR_{Cl}$-BC (bone char) composites), however the loading of BC (bone char) was varied from 0.1 to 5.0 g/L as shown in Table 5 and FIG. 12.

Figure 12:
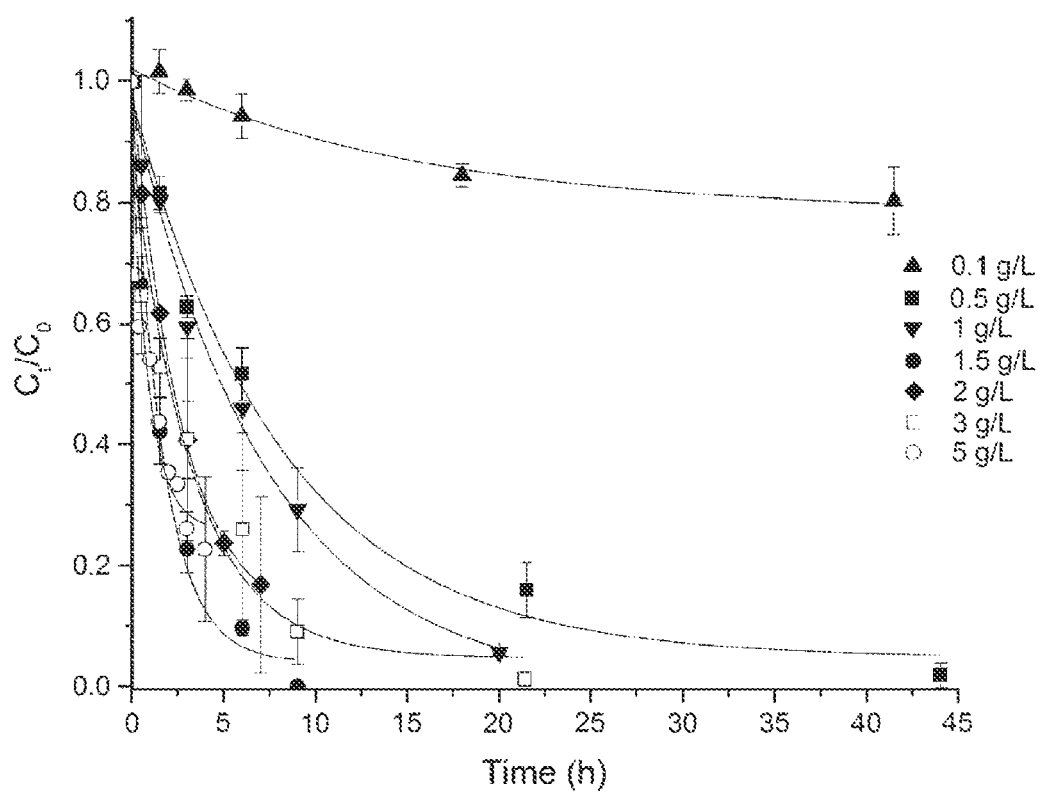
FIG. 12 shows data from Example 7. The figure shows the first-order kinetics of TCE dechlorination by using composites with constant $GR_{CI}$ concentrations, but different bone char loadings (0.1 g/L, 0.5 g/L, 1 g/L, 1.5 g/L, 2 g/L, 3 g/L and 5 g/L).

FIG. 12 shows the first-order kinetics of TCE dechlorination by using composites with constant $GR_{Cl}$ concentrations, but different bone char loadings (0.1 g/L, 0.5 g/L, 1 g/L, 1.5 g/L, 2 g/L, 3 g/L and 5 g/L).

Table 5 shows the TCE removal rates and the resulting acetylene production rates for the different composites. It was seen that higher bone char loading in the composites resulted in faster TCE removal rates up to a bone char dose of approximately 1.5 g/L at which dose the reaction rate levelled out.

TABLE 5

The effect of BC (89440_FLUKA) loading to the reactivity of GR + BC system to remove TCE (in all experiments the concentration of $GR_{Cl}$ corresponded to 7.4 g/L Fe(II) in GR.

| BC dose, g/L | $k_{app(TCE)}$[1], h$^{-1}$ | $k_{app(Acetylene)}$[2], h$^{-1}$ |
|---|---|---|
| 0.1 | 0.093 ± 0.0020[3] | 0.034 ± 0.004 |
| 0.5 | 0.098 ± 0.024 | 0.100 ± 0.003 |
| 1 | 0.136 ± 0.020 | 0.115 ± 0.015 |
| 1.5 | 0.420 ± 0.036 | 0.308 ± 0.040 |
| 2 | 0.315 ± 0.009 | 0.316 ± 0.059 |
| 3 | 0.215 ± 0.022 | 0.150 ± 0.019 |
| 5 | 0.440 ± 0.064 | 0.258 ± 0.121 |

[1]First-order rate constant for reduction of TCE
[2]First-order rate constant for production of acetylene
[3]The ± xxxx represent the standard variation based on triplicates Example 8: Sulfate Green Rust ($GR_{SO4}$)+BC Composites In this experiment the reactivity of a sulphate interlayered GR ($GR_{SO4}$)+BC composite with TCE was tested, in order to clarify if different types of GRs show different reactivities. In the 12 mL head space reactor, a 5 mL suspension containing 10 mM or 22 mM of Fe(II) present in $GR_{SO4}$ was mixed with 1.0 g/L bone char (Fluka) at an initial concentration of TCE of ~20 μM.

The total amount of removed TCE was getting stable after 2 days. After 7 days reaction, only small amounts of TCE (no more than 5%) had been reduced to acetylene. Hence, $GR_{SO4}$+BC composite reacts much slower than the $GR_{Cl}$+BC composites.

Example 9: Fe(II)+BC Composites

Even though Fe(II) is the key element in the GR+BC composite to reduce TCE, Fe(II) added as solution to bone char (Fluka) did not show any reduction of TCE during 6 days of reaction demonstrating that the GR source of Fe(II) is needed for the dehalogenating properties of the composite. In this experiment the Fe(II) concentration in solution was 11 mM 7.4 or 22 mM (Fe(II) added as $FeCl_2$) and the BC concentration 1.0 g/L. The initial pH was 6.26, and no adjustment of pH was performed.

Example 10: Test of Reductive Dechlorination in Tap Water and Contaminated Groundwater Tap water spiked with TCE stock solution was tested in the lab. The experimental setup comprised the preparation of the composite from freshly-prepared 11 mM Fe(II) present in $GR_{Cl}$+1.0 g/L BC (Fluka) suspension that was centrifuged at 5000 rpm for 1 min, or the 22 mM Fe(II) in GR. After discarding the supernatant, the precipitate was re-suspended in tap water and transferred to the reactors (two 12 mL headspace vials each filled with 5 mL suspension) reaching concentrations of 7.4 g/L $GR_{Cl}$+1.0 g/L BC or 3.2 g/L GR+1.0 g/L BC. Before the reactors were sealed, TCE stock solution was spiked to give initial concentrations of 20 µM. After 1 day, 12% TCE was reduced to acetylene and after 6 days, 90% of TCE was reduced. All TCE was reduced to acetylene after 11 days.

The tap water (from Frederiksberg water) composition was hard water with a high bicarbonate content. Tap water spiked with TCE stock solution was tested in the lab. The experimental setup comprised the preparation of the composite from freshly-prepared $GR_{Cl}$+1.0 g/L BC (Fluka) suspension that was centrifuged at 5000 rpm for 1 min. After discarding the supernatant, the precipitate was re-suspended in tap water (approximate composition: $HCO_3^-$ 390 mg/L, $Cl^-$ 130 mg/L, $SO_4^{2-}$ 140 mg/L, $Ca^{2+}$: 165 mg/L, $Mg^{2+}$ 28 mg/L, $Na^+$ 53 mg/L, $K^+$ 5 mg/L; pH 7.5) and transferred to the reactors (two 12 mL headspace vials each filled with 5 mL suspension) reaching concentrations of 7.4 g/L $GR_{Cl}$+1.0 g/L BC or 3.2 g/L GR+1.0 g/L BC.

Real contaminated groundwater which contains cis-DCE, TCE and PCE as main contamination was tested by using $GR_{Cl}$+BC (Fluke). In this experiment 0.8 mL GR+BC slurry+4.2 mL groundwater was mixed in 10 mL headspace vial resulting in a final concentration of 7.4 g/L $GR_{Cl}$ and 1.5 g/L bone char or 3.2 g/L GR+1.5 g/L BC. Parallel blank samples of 4.2 mL groundwater and 0.8 mL tap water were included.

FIG. 13 shows both TCE and PCE decreased with the production of acetylene after reaction for 1 and 2 days, indicating that GR+BC composites can reduce chlorinated solvents in a multi component mixture present in groundwater.

Example 11: Acid Treated Composites

Composites comprising green rust (GR) and bone char, where the bone char was acid treated ($BC_{AT}$) were produced as described below. The composites are abbreviated as GR-$BC_{AT}$.

Composite Preparation

BC and $BC_{AT}$ was used to prepare oxygen-free 2.0 $g \cdot L^{-1}$ BC and 5.0 $g \cdot L^{-1}$ $BC_{AT}$ stock suspensions, respectively. Bone char (BC) (Fluka AG, CH-9470 Buchs, 89440, Denmark) was used without any pretreatment. A stock suspension of 2.0 $g \cdot L^{-1}$ BC was prepared by suspending 1.0 g BC powder in 500 mL TI water, which had been flushed with argon at a flow of 30 $mL \cdot min^{-1}$ for at least 1 h to obtain an oxygen-free stock suspension.

Acid-treated bone char ($BC_{AT}$) was made from BC by extracting with 1 M HCl. A stock suspension of 5.0 $g \cdot L^{-1}$ $BC_{AT}$ was prepared by transferring 2.5 g $BC_{AT}$ powder to 500 mL TI water, which had been flushed with argon at a flow of 30 $mL \cdot min^{-1}$ for at least 1 h to obtain an oxygen-free stock suspension. The above BC or $BC_{AT}$ stock suspensions were transferred into the anaerobic chamber immediately after finishing argon flushing.

10 g bone char (BC) was suspended in 500 mL 1 M HCl solution under constant magnetic stirring at 500 rpm for 2 hours. The suspension was subsequently centrifuged at 12,000 g for 20 min, the supernatant discarded and the pellet re-suspended in fresh 500 mL 1 M HCl solution. The above acid-washing step was repeated three times. The precipitation collected from the last time after centrifuging was washed by vacuum filtration with TI water until the pH of filtrate was close to 7.0, followed by drying in the oven at ~85° C. overnight.

The specific surface area of BC and $BC_{AT}$ measured by BET (Gemini VII 2390, Micromeritics) was 106 and 586 $m^2/g$, respectively. The average particle size of BC and $BC_{AT}$ measured by Zetasizer Nano ZS (Malvern Instruments) was 0.66 and 1.21 µm, respectively. The elemental composition of both BC and $BC_{AT}$ determined by ICP-OES. The results are shown in Table 6. Element composition was determined by ICP-OES (Agilent Technology, 5100). To prepare samples for ICP-OES, a 25 mL ceramic crucible was firstly burned at 1000° C. for 2 hours for removing residual impurities. Then, the accurately-weighed sample (~0.2 g) was transferred to the crucible, and ashed at 1000° C. for 2 hours in the muffle furnace. After cooling, the ash was digested with 8 mL concentrated nitric acid (65%, EMSURE®, EMD Millipore) for 2 days, after which the digest was quantitatively transferred to a 50 mL volumetric flask and filled with Milli-Q water. The digestion was then transferred to the 15 mL PTFE vial, measured by ICP-OES. The C/N composition in BC and $BC_{AT}$ was determined using a C/N analyzer (Elementar Vario Macro Cube). The sample was prepared by mixing 10-15 mg carbon with 10-15 mg tungsten granulated. Sulfanilamid was used as standard.

A $GR_{Cl}$ stock suspension with GR concentration of ~6.0 $g \cdot L^{-1}$ equivalent to iron(II) in GR $(Fe(II)_{GR})$ of 46 mM was prepared. $GR_{Cl}$ were synthesized by co-precipitation of iron(II) and iron(III) salts in the presence of glycine and with supply of NaOH to keep pH constant at pH $8.0^2$. Specifically, 400 mL aqueous solution of 70 mM glycine and 500 mM NaCl (pH 8.0) was added to a 500 mL glass flask and continuously stirred (300 rpm) using a pH-stat (Metrohm, 719 Titrino) at room temperature. Then 20 mL of 0.5 M $FeCl_2$ stock solution was injected into the synthesis flask, resulting in approx. 25 mM of iron(II). The pH was readjusted to 8.0 by titrating with 1 M NaOH (max. 5 $mL \cdot min^{-1}$, min. 3 $mL \cdot min^{-1}$) using the pH-stat and then, while still running in pH-stat mode, 15 mL of 0.1 M $FeCl_3$ solution was injected into the synthesis flask at a rate of 10 $mL \cdot min^{-1}$, causing $GR_{Cl}$ to precipitate. During $GR_{Cl}$ synthesis, the headspace was flushed with argon at a rate of 30 $mL \cdot min^{-1}$. After $FeCl_3$ addition had terminated, the suspension was stirred for another 5 min, after which the pH-stat was stopped and the flask sealed and transferred to an anoxic chamber (95% $N_2$ and 5% $H_2$, Coy Laboratories, Michigan, USA). In the anoxic chamber, the synthesis suspension was transferred to 15 mL polyethylene centrifugation tubes, centrifuged at 4190 g for 5 min, and washed one time by oxygen-free TI water. The washed $GR_{CI}$ was re-suspended in 100 mL oxygen-free TI water to obtain a final suspension with a concentration of 46 mM $Fe(II)_{GR}$ (iron (II) in GR), corresponding to a GR concentration of ~6.0 g·L$^{-1}$.

TABLE 6

Elemental composition of BC (bone char) and $BC_{AT}$ (acid-treated bone char) determined by ICP-OES[a] and C/N analyzer[b]

| elements | mass in BC, µg · g$^{-1}$ | mass in $BC_{AT}$, µg · g$^{-1}$ |
|---|---|---|
| Al | $1.01 \times 10^3$ | $0.60 \times 10^3$ |
| Ca | $3.74 \times 10^5$ | $2.20 \times 10^3$ |
| Cr | 10.4 | 1.08 |
| Cu | 73.3 | 10.2 |
| Fe | $1.59 \times 10^2$ | 80.8 |
| K | $0.73 \times 10^3$ | $0.22 \times 10^3$ |
| Mg | $4.86 \times 10^3$ | $0.48 \times 10^3$ |
| Mn | 16.9 | 9.42 |
| Na | $4.11 \times 10^3$ | 93.0 |
| Zn | 150 | 8.77 |
| P | $1.18 \times 10^5$ | $1.62 \times 10^3$ |
| S | $1.36 \times 10^3$ | 70.3 |
| C[a] | $1.41 \times 10^5$ | $7.2.9 \times 10^5$ |
| N[a] | $2.12 \times 10^4$ | $6.63 \times 10^4$ |

[a] The pretreatment of samples appear from the text. Except for C and N, the elements were represented as µg per g sample.
[b] C and N were meaured by C/N analyzer with the relative composition shown as percentage For the experiments with laboratory spiked waters, 2.5 mL of $GR_{CI}$ stock suspension was mixed with 2.5 mL BC stock or 0.15 mL $BC_{AT}$ stock suspension and 2.35 mL oxygen-free TI water in 10 mL headspace vials before spiking with chlorinated ethylene stock solutions.

For the experiment with contaminated groundwater, a GR-BC stock slurry comprising ~12 g·L$^{-1}$ $GR_{CI}$ and 2.5 g·L$^{-1}$ $BC_{AT}$ was prepared separately for later injection into vials. All handling and mixing of suspensions until vials had been capped were performed in an anoxic glove box (Coy Laboratories, Michigan, USA, containing 95% $N_2$ and 5% $H_2$). Specification of the chemicals used appear from Table 7.

ML33176, Mikrolab, Denmark) and magnetic crimp caps (20 mm, blank 6 mm hole, Thermos Scientific). Then vials were transferred outside the anoxic chamber, shielded from light by wrapping with aluminum foil, and placed on an orbital shaker (IKA, KS 130 control) at 300 rpm at room temperature (22° C.). At different time intervals, 200 µL headspace was sampled for quantification of chlorinated ethylenes and their products by using a HS-GC-ECD/FID system (Triplus300 headspace autosampler with Thermo TRACE GC 1300 gas chromatograph) combined with Pora-BOND U column (25 m×0.35 mm×7 µm)(details in Text S2). Triplicates were used throughout and vials were discarded after measurement. In addition, control samples containing GR or BC or $BC_{AT}$ alone spiked with the target compounds, all at the same concentrations as described above, were included.

Degradation of Chlorinated Ethylenes by $GR-BC_{AT}$ Composite in Real Groundwater.

The groundwater sample was collected from Møllevej 9, 2990 Nivα, Denmark (717775.43°, 6203320.06°) at a depth of 12 m in a polluted sandy aquifer, and stored at 4° C. prior to use. The groundwater composition appears from Table 8. To carry out the batch experiment, 1 mL of the composite stock slurry (see above) was injected into each 10 mL vial, followed by addition of 4 mL groundwater, resulting in final concentrations of $GR_{CI}$ of ~2.4 g·L$^{-1}$ and $BC_{AT}$ of 0.5 g·L$^{-1}$. All sample vials were placed on an orbital shaker at 300 rpm at ambient temperature (22° C.).

Solid Phase Analysis

Powder X-ray diffraction (XRD) was used to check the purity of GR syntheses and to identity crystalline components in BC. Determination of anions, cations and TOC in groundwater were performed by ion chromatography, ICP-OES and TOC determination, respectively. Powder XRD was used to check the identity of crystalline materials in BC and $BC_{AT}$. 1 mL BC stock slurry (5 g·L$^{-1}$) or $BC_{AT}$ stock slurry (5 g·L$^{-1}$) was smeared onto a 2 cm×1 cm glass plate and dried in the anoxic chamber for 24 hours, and subsequently the dry film was examined by XRD. XRD was

TABLE 7

Specification of chemicals used in the study

| chemicals | fomula | specification information |
|---|---|---|
| PCE (perchloroethylene) | $C_2Cl_4$ | EMD Millipore, for spectroscopy Uvasol |
| TCE (trichloroethylene) | $C_2HCl_3$ | EMD Millipore, for analysis EMSURE ACS, Reag. Ph Eur. |
| Cis-DCE (cis-dichloroethylene) | $C_2H_2Cl_2$ | Aldrich, 97%, analytical standard |
| Trans-DCE (trans-dichloroethylene) | $C_2H_2Cl_2$ | Sigma-Aldrich, analytical standard |
| Methanol | $CH_3OH$ | EMD Millipore, for gas chromatography MS SupraSolv |
| Gas mixture containing 0.1% methane, 0.1% ethene, 0.1% ethane, 0.1% acetylene in $N_2$ | $CH_4$, $C_2H_4$, $C_2H_6$, $C_2H_2$, $N_2$ | AGA gas |
| commercial hydroxyapatite | $[Ca_5(OH)(PO_4)_3]_x$ | Nanopowder, <200 nm particle size (BET), ≥97%, synthetic, Aldrich |

Dehalogenation of Chlorinated Ethylenes by GR-BC Composites in Spiked Waters.

All dehalogenation experiments were carried out in the anoxic chamber (see above). After preparation of the composite in the nominal 10 mL headspace vial, 25 µL of 4.0 mM chlorinated ethylene (PCE, TCE, cis-DCE, trans-DCE) stock solutions (in methanol) was spiked to each vial to obtain an initial concentration of 20 µM. The vials were immediately sealed with Teflon-lined silicone septa (20 mm, conducted using a Siemens D5000 X-ray diffractometer applying monochromatic Co Kα radiation (40 kV, 40 mA) and a scanning rate of 0.6° 2θ min$^{-1}$ in the range 5 to 90° 2θ. The smears of the $GR_{CI}$ were highly oriented exhibiting strongly enhanced basal reflections with no strong reflections detected above 40° 2θ. For BC and $BC_{AT}$, the same preparation method and analytical method were used.

Figure 15:
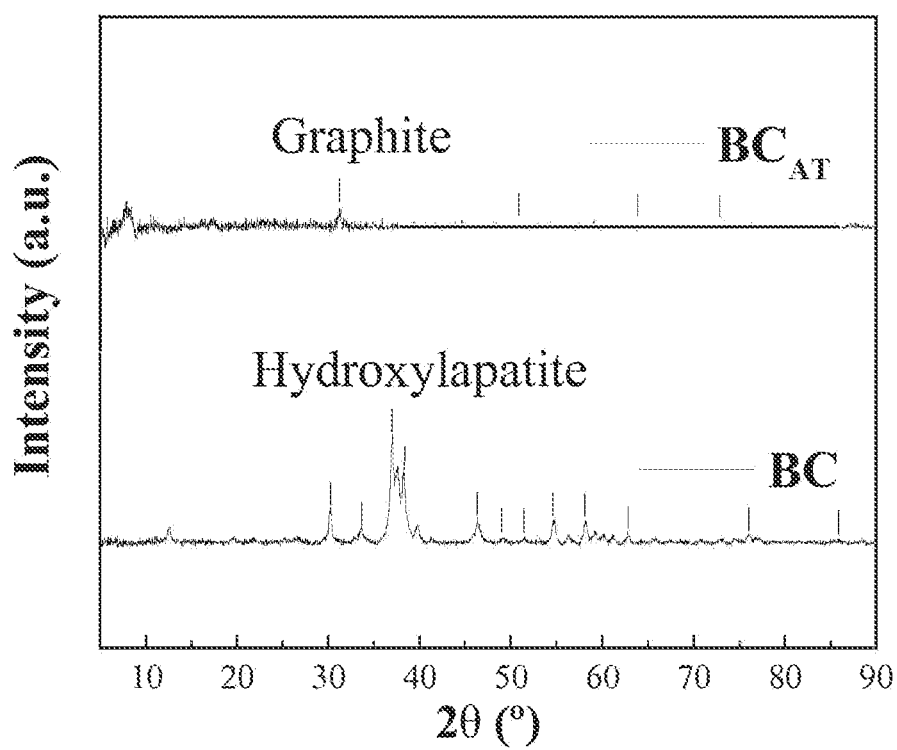
FIG. 15 shows XRD data from Example 11, where XRD patterns of bone char (BC) with marked peaks identified as hydroxyapatite (00-001-1008 in JCPDF reference database) and acid-treated BC ($BC_{AT}$) with the marked peak consistent with the graphite pattern (00-003-0401 in JCPDF reference database).

The results are shown in FIG. 15, and show XRD pattern of the BC after acid washing fits a graphite pattern reference and no characteristic peaks due to hydroxyapatite were present, demonstrating that the hydroxyapatite in BC was efficiently removed by simply acid treatment leaving the carbonaceous material that has a graphitic structure.

The BC and $BC_{AT}$ were analyzed by Raman spectroscopy. Raman spectra were collected using XploRA PLUS (Horiba Scientific, France) with a 532 nm laser. The wavelength range recorded was 725-2000 $cm^{-1}$. The resulting Raman spectra show signals of D-line (1350 $cm^{-1}$) and G-line (1580 $cm^{-1}$), attributed to the disordered edges of the graphene layer and $E_{2g}$ in-plane vibration mode from the graphite, respectively. Similar pattern in both BC and $BC_{AT}$ spectra suggests that disordered graphite-like carbon component exists both in BC and acid treated BC, and hence, that the carbonaceous material kept its original graphitic properties after acid treatment.

The BC and $BC_{AT}$ were analyzed by XPS survey spectra, and the results show that the characteristic peaks of P and Ca from BC disappeared after acid treatment. The C 1s spectra of untreated BC and $BC_{AT}$ could be deconvoluted into four peaks, i.e. C=C (284.2 eV), C—C (285.7 eV), C—O/C—N or C=O (287.1 eV) and O—C=O (289.5 eV). Only slight shift happened to the peaks after acid treatment. Four deconvoluted peaks from the N 1s XPS spectra may be tentatively attributed to four types of graphene-doped N configurations, i.e. oxidized pyridine-N (403.7 eV), quaternary-N (401.3 eV), pyrrolic-N (399.2 eV) and pyridinic-N (396.57 eV), observed both in BC and $BC_{AT}$.

Figure 16:
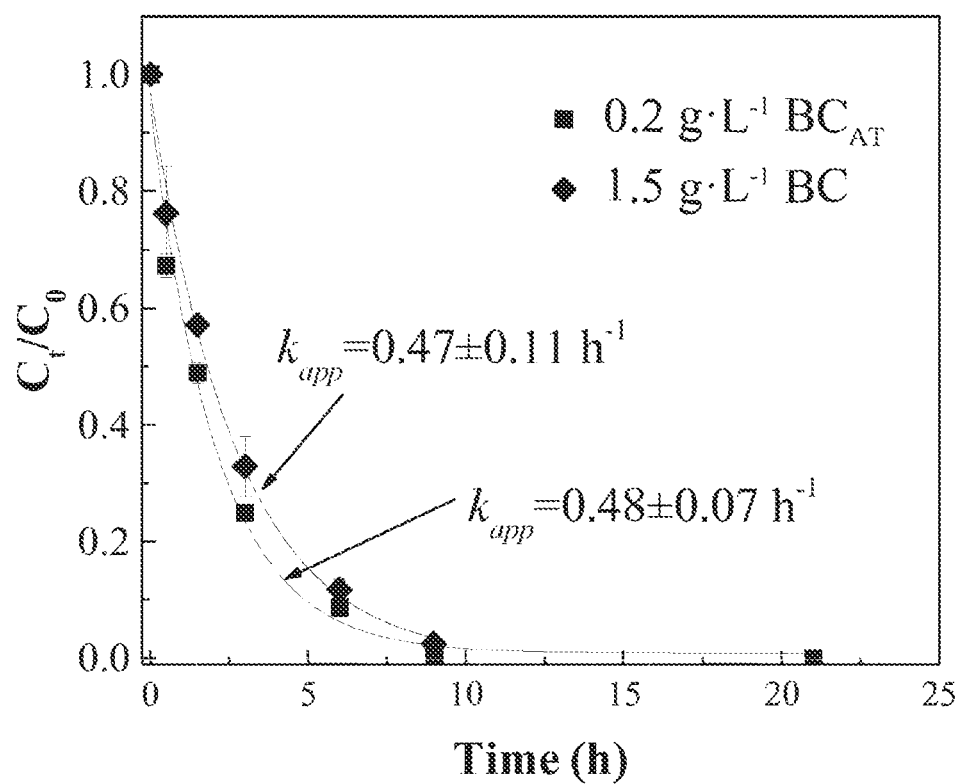
FIG. 16 shows reaction kinetics data from Example 11. Kinetics of TCE degradation by the composite made of $GR_{CI}$ (~3.2 g·L$^{-1}$) and $BC_{AT}$ (0.2 g·L$^{-1}$) and BC (1.5 g·L$^{-1}$), respectively, together with pseudo-first-order kinetic fitting and corresponding parameters. Initial concentration of TCE of ~20 µM, pH 8.0. Error bars represent standard error of triplicates.

Comparison reactivity of the GR-BC and GR-$BC_{AT}$ composite 2.5 mL of $GR_{CI}$ stock suspension (~6.3 g·$L^{-1}$ or 22 mM Fe(II) in $GR_{CI}$) was mixed with 2.5 mL BC stock (3 g·$L^{-1}$ bone char powder in oxygen-free triple-deionized water (TI-water, resistivity ≥20 MΩ·$cm^{-1}$) or 0.15 mL $BC_{AT}$ stock suspension (5 g·$L^{-1}$ acid treated bone char powder in oxygen-free TI-water) and 2.35 mL oxygen-free TI water in 10 mL headspace vials to get ~3.2 g·$L^{-1}$ $GR_{CI}$ and 1.5 g·$L^{-1}$ BC or 0.15 g·$L^{-1}$ $BC_{AT}$ as GR-BC or GR-$BC_{AT}$ composite before spiking with 25 μL TCE stock solutions (in methanol). All handling and mixing of suspensions until vials had been capped were performed in an anoxic glove box (Coy Laboratories, Michigan, USA, containing 95% $N_2$ and 5% $H_2$). The results are shown in FIG. 16. The GR-$BC_{AT}$ composite showed similar $k_{app}$ for TCE degradation as the GR-BC composite per mass of C, that is 0.15 g·$L^{-1}$ C mass in $BC_{AT}$ to 0.21 g·$L^{-1}$ in BC, which was calculated from the C content in the two materials (Table 6). We conclude that it is the carbonaceous component in the BC and not the hydroxyapatite or the combination of the two components that functions as the mediator in reduction of chlorinated ethylenes by GR.

$BC_{AT}$ dose effects on the $GR_{CI}$-$BC_{AT}$ composite reactivity with TCE 2.5 mL of $GR_{CI}$ stock suspension was mixed with 0.15, 0.20, 0.50 and 1.00 mL $BC_{AT}$ stock suspension (5 g·$L^{-1}$ acid treated bone char powder in oxygen-free TI water) in 10 mL headspace vials with oxygen-free TI water filled to 5 mL to get ~3.2 g·$L^{-1}$ $GR_{CI}$ and 0.15, 0.20, 0.50 and 1.00 g·$L^{-1}$ $BC_{AT}$ as GR-$BC_{AT}$ composite before spiking with 25 μL TCE stock solutions (in methanol). All handling and mixing of suspensions until vials had been capped were performed in an anoxic glove box (Coy Laboratories, Michigan, USA, containing 95% $N_2$ and 5% $H_2$).

Figure 17:
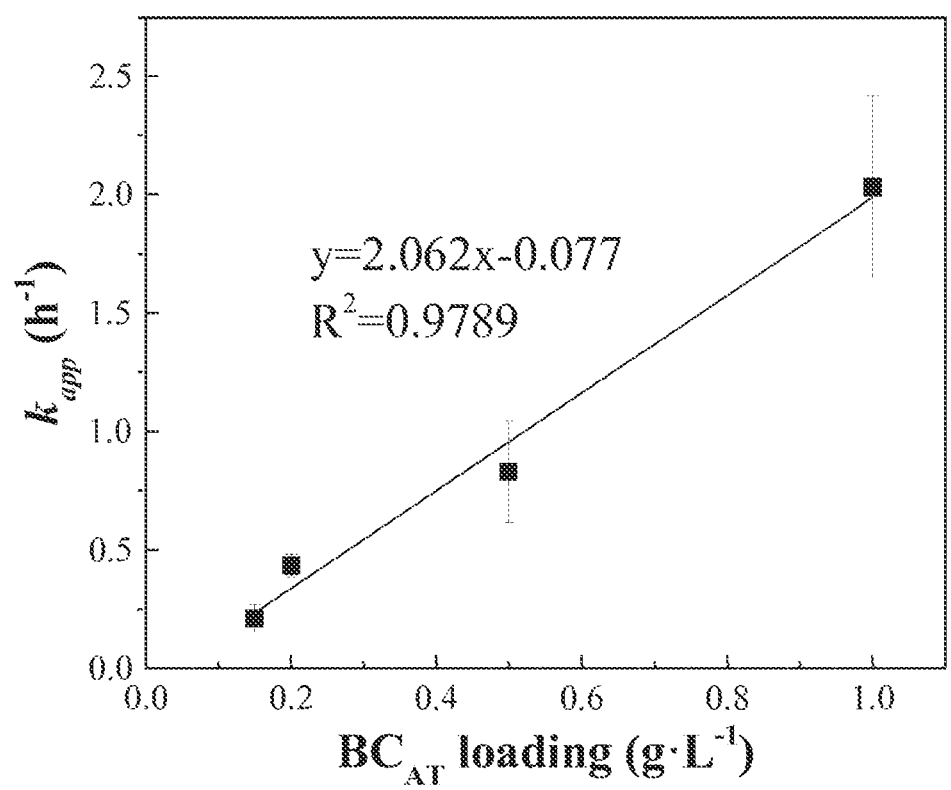
FIG. 17 shows reaction kinetics data from Example 11. Pseudo-first order kinetic constants of acetylene formation as a function of $BC_{AT}$ loading at constant $GR_{CI}$ concentration, including linear fitting.

The results are shown in FIG. 17. With $BC_{AT}$ loading increasing from 0.15 to 1.00 g·$L^{-1}$, the kinetics of acetylene production by the GR-$BC_{AT}$ composite increases almost linearly from 0.29±0.03 to 0.54±0.09 $h^{-1}$. It indicates that the reactivity of the composite can be enhanced simply by increasing $BC_{AT}$ dose.

GR Dose Effects on the $GR_{CI}$-$BC_{AT}$ composite reactivity with TCE 0.2, 0.6, 1.0, 2.5 and 4.5 mL of $GR_{CI}$ stock suspension (~6.3 g·$L^{-1}$) was mixed with 0.15 mL $BC_{AT}$ stock suspension (5 g·$L^{-1}$ $BC_{AT}$ powder in oxygen-free TI water) in 10 mL headspace vials with oxygen-free TI water filled to 5 mL to get ~0.25, 0.76, 1.3, 3.2 and 5.7 g·$L^{-1}$ $GR_{CI}$ and 0.15 g·$L^{-1}$ $BC_{AT}$ as GR-$BC_{AT}$ composite before spiking with 25 μL TCE stock solutions (in methanol). All handling and mixing of suspensions until vials had been capped were performed in an anoxic glove box (Coy Laboratories, Michigan, USA, containing 95% $N_2$ and 5% $H_2$).

Figure 18:
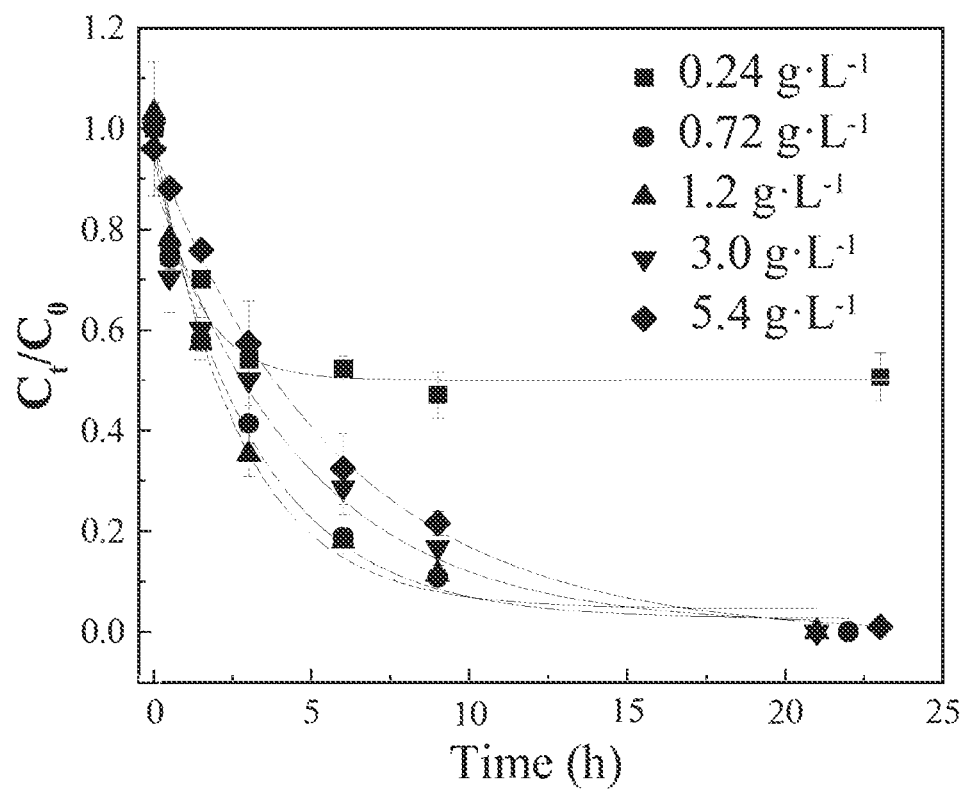
FIG. 18 shows reaction kinetics data from Example 11. Pseudo-first order kinetics of TCE dechlorination as a function of $GR_{CI}$ loading at constant $BC_{AT}$ concentration, including pseudo-first order fitting.

The results are shown in FIG. 18. No big difference in TCE dechlorination rate (0.17±0.01 $h^{-1}$-0.37±0.05 $h^{-1}$) was observed when GR dosage ranged between 0.76 and 5.7 g·$L^{-1}$ and at a constant dose of $BC_{AT}$ (~0.15 g·$L^{-1}$). When very low $GR_{CI}$ concentration, ~0.25 g·$L^{-1}$, was used, the initial reaction rate was as fast as for the other GR doses. But after 3 hours, the reaction ceased and no further TCE dechlorination was observed. This is attributed to full oxidation of the GR. These results show that we may obtain the same performance of the composite towards removal of chlorinated ethylenes as long as there is sufficient GR reduction capacity for the dose of chlorinated ethylene. Additionally, the observations suggests that the rate limiting reaction sites are on the carbonaceous component.

Anion Effects on the $GR_{CI}$-$BC_{AT}$ Reactivity 2.5 mL of $GR_{CI}$ stock suspension was mixed with 0.15 mL $BC_{AT}$ stock suspension (5 g·$L^{-1}$ $BC_{AT}$ powder in oxygen-free TI water) in 10 mL headspace vials with oxygen-free TI water and oxygen-free anion stock solution filled to 5 mL to get a GR-$BC_{AT}$ composite suspension containing ~3.2 g·$L^{-1}$ $GR_{CI}$ and 0.15 g·$L^{-1}$ with variable anion concentrations before spiking with chlorinated ethylene stock solutions. All handling and mixing of suspensions until vials had been capped were performed in an anoxic glove box (Coy Laboratories, Michigan, USA, containing 95% $N_2$ and 5% $H_2$). The results showed that the presence of individual chloride and sulfate up to 10 mM did not result in significant inhibition of dechlorinating reactivity of the $GR_{CI}$-$BC_{AT}$ composite. The reaction rate of TCE dechlorination was not reduced due to co-existing bicarbonate at low concentration of 1 mM. With bicarbonate level increasing to 5 mM and 10 mM, the pseudo-first order kinetic constant decreased by ~50% to 0.11±0.03 $h^{-1}$ and 0.06±0.02 $h^{-1}$. The experiments suggest that the presence of common anions will not reduce the reactivity of the composite greatly; carbonate at higher concentrations (but not commonly seen for groundwater) may have some effect.

Comparison of Reactivity of the GR-BC or GR-$BC_{AT}$ composite made of three different types of green rusts.

$GR_{CI}$ was synthesized by co-precipitation of iron(II) and iron(III) salts in the presence of glycine and with supply of NaOH to keep pH constant at pH $8.0^2$. Specifically, 400 mL aqueous solution of 70 mM glycine and 500 mM NaCl (pH 8.0) was added to a 500 mL glass flask and continuously stirred (300 rpm) using a pH-stat (Metrohm, 719 Titrino) at room temperature. Then 20 mL of 0.5 M $FeCl_2$ stock solution was injected into the synthesis flask, resulting in approx. 25 mM of iron(II). The pH was readjusted to 8.0 by titrating with 1 M NaOH (max. 5 mL·$min^{-1}$, min. 3 mL·$min^{-1}$) using the pH-stat and then, while still running in pH-stat mode, 15 mL of 0.1 M $FeCl_3$ solution was injected into the synthesis flask at a rate of 10 mL·$min^{-1}$, causing $GR_{Cl}$ to precipitate. During $GR_{Cl}$ synthesis, the headspace was flushed with argon at a rate of 30 mL·min$^{-1}$. After FeCl$_3$ addition had terminated, the suspension was stirred for another 5 min, after which the pH-stat was stopped and the flask sealed and transferred to an anoxic chamber (95% N$_2$ and 5% H$_2$, Coy Laboratories, Michigan, USA). In the anoxic chamber, the synthesis suspension was transferred to 15 mL polyethylene centrifugation tubes, centrifuged at 4190 g for 5 min, and washed one time by oxygen-free TI water. The washed $GR_{Cl}$ was re-suspended in 100 mL oxygen-free TI water to obtain a final suspension with a concentration of 44 mM Fe(II)$_{GR}$ (iron (II) in GR), corresponding to a GR concentration of 6.3 g·L$^{-1}$.

Synthesis of $GR_{SO4}$ followed the same procedure as for $GR_{Cl}$ except for using Fe(II) and Fe(III) sulfate salts solution for co-precipitation. Synthesis of $GR_{CO3}$ also followed the same procedure but with Na$_2$CO$_3$ serving as base for adjusting and keeping a constant pH.

Figure 19:
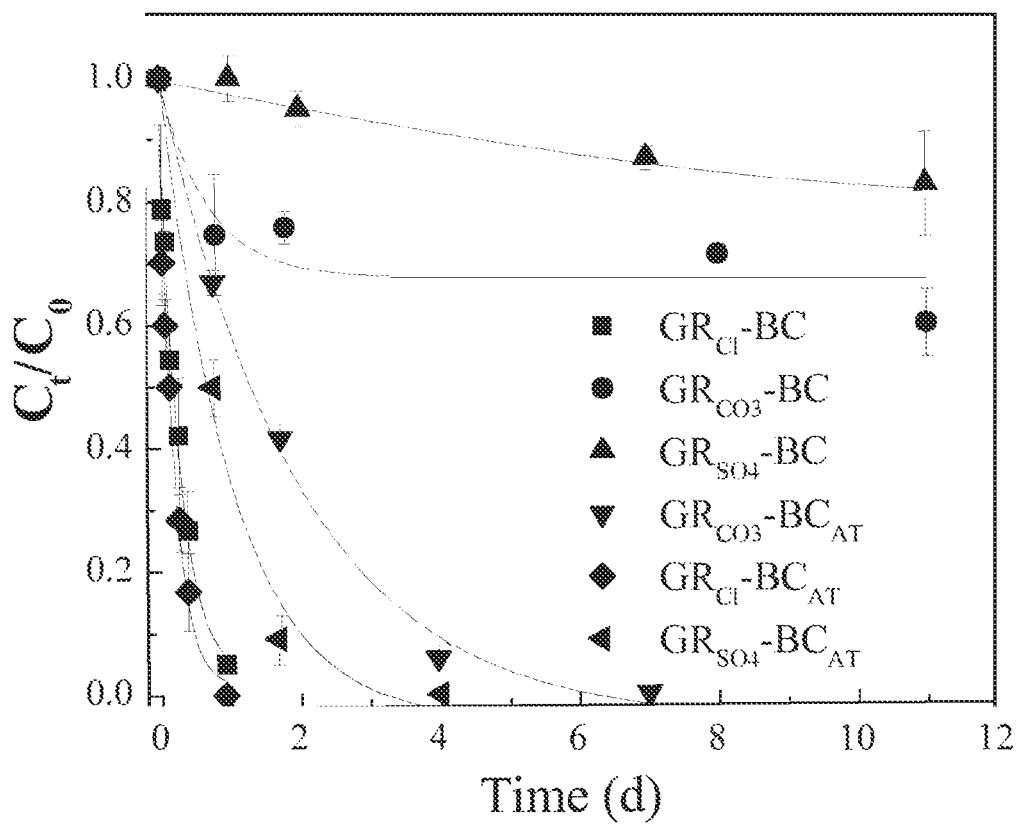
FIG. 19 shows reaction kinetics data from Example 11. Pseudo-first order kinetics of TCE dechlorination normalized by the initial concentration of TCE shown as $C_t/C_0$ by using the GR-BC or GR-$BC_{AT}$ composite produced from different GR types. The composite consists of ~3.2 g·L$^{-1}$ GR and 1.0 g·L$^{-1}$ BC or 0.15 g·L$^{-1}$ $BC_{AT}$, initial mass of TCE of ~0.1 µmol in 10 mL headspace vial, pH 8.0.

Experimental set-up: To prepare the GR-BC composite, 2.5 mL of GR stock suspension ($GR_{Cl}$, or $GR_{SO4}$ or $GR_{CO3}$) was mixed with 2.5 mL BC stock suspension (2 g·L$^{-1}$ bone char powder in oxygen-free TI water) in 10 mL headspace vials to get ~3.2 g·L$^{-1}$ GR and 1.0 g·L$^{-1}$ BC as GR-BC composite. Thereafter, 25 µL TCE stock solutions (4 mM in methanol) was spiked into the vial, followed by sealing the vial with magnetic and silicon/PTFE septa. To prepare the GR-BC$_{AT}$ composite, 2.5 mL of GR stock suspension ($GR_{Cl}$, or $GR_{SO4}$ or $GR_{CO3}$) was mixed with 0.15 mL BC$_{AT}$ stock suspension (5 g·L$^{-1}$ acid treated bone char powder in oxygen-free TI water) with oxygen-free TI water filled to 5 mL in 10 mL headspace vials to get ~3.2 g·L$^{-1}$ GR and 0.15 g·L$^{-1}$ BC$_{AT}$ as GR-BC$_{AT}$ composite. Thereafter, 25 µL TCE stock solutions (4 mM in methanol) was spiked into the vial, followed by sealing the vial with magnetic and silicon/PTFE septa. All handling and mixing of suspensions until vials had been capped were performed in an anoxic glove box (Coy Laboratories, Michigan, USA, containing 95% N$_2$ and 5% H$_2$). The results are shown in FIG. 19. When $GR_{Cl}$, $GR_{SO4}$ or $GR_{CO3}$ were mixed with untreated BC to produce the respective GR-BC composites, the reactivity order was: $GR_{Cl} \gg GR_{CO3} > GR_{SO4}$. The composite consisting of BC$_{AT}$ and the respective GRs exhibited a slightly different reactivity sequence, with the $GR_{CO3}$ as the GR component resulting in the slowest dehalogenation: $GR_{Cl} > GR_{SO4} > GR_{CO3}$. Another conclusion is that the BC$_{AT}$ facilitates the reducing reactivity of $GR_{SO4}$ and $GR_{CO3}$ to a higher extent than untreated BC. It indicates that BC$_{AT}$ is to be preferred compared to BC for two reasons: reactivity and less sensitivity to the anion present in the GR (and thus the water).

Reactivity of the GR-BC$_{AT}$ Composite Towards Degradation of Chlorinated Ethylenes in Real Groundwater For the experiment with contaminated groundwater, a GR-BC stock slurry comprising ~13 g·L$^{-1}$ $GR_{Cl}$ and 2.5 g·L$^{-1}$ BC$_{AT}$ was prepared separately. To carry out the batch experiment, 1 mL of a composite stock slurry (see above) was injected into each 10 mL vial, followed by addition of 4 mL groundwater, resulting in final concentrations of $GR_{Cl}$ of ~2.6 g·L$^{-1}$ and BC$_{AT}$ of 0.5 g·L$^{-1}$. Control samples were prepared by the same procedure as above but 1 mL of oxygen-free TI water instead of a composite stock slurry was mixed with 4 mL original groundwater. All sample vials were placed on an orbital shaker at 300 rpm at ambient temperature (22° C.). The basic physiochemical parameters of 5 groundwater are listed in Table 8.

TABLE 8

Basic physiochemical parameters of 5 groundwater

| parameters | A[a] | B[b] | C[c] | D[d] | E[e] |
|---|---|---|---|---|---|
| Contaminants, µg/L[f] | TCE: 9000 | PCE: 8000, TCE: 420 | PCE: 19000, TCE: 1300 | PCE: 470, TCE: 1100 | PCE: 26000, TCE: 1800 |
| Alkalinity, mg[HCO$_3^-$]/L[g] | 381 | 246 | 245 | 245 | 238 |
| Anions, mg/L[h] | Cl$^-$: 220, NO$_3^-$: 5.7, SO$_4^{2-}$: 5.9 | Cl$^-$: 626, NO$_3^-$: 5.6, SO$_4^{2-}$: 7.3 | Cl$^-$: 33, NO$_3^-$: 5.8, SO$_4^{2-}$: 6.3 | Cl$^-$: 342, NO$_3^-$: 3.9, SO$_4^{2-}$: 81 | Cl$^-$: 68, NO$_3^-$: 2.1, SO$_4^{2-}$: 38 |
| Cations, mg/L[i] | Ca$^{2+}$: 140, Mg$^{2+}$: 11, K$^+$: 3.7, Na$^+$: 121 | Ca$^{2+}$: 205, Mg$^{2+}$: 16, K$^+$: 7.2, Na$^+$: 264 | Ca$^{2+}$: 100, Mg$^{2+}$: 5.0, K$^+$: 1.2, Na$^+$: 4.1 | Ca$^{2+}$: 230, Mg$^{2+}$: 33, K$^+$: 9.3, Na$^+$: 110 | Ca$^{2+}$: 150, Mg$^{2+}$: 15, K$^+$: 3.0, Na$^+$: 24 |
| TOC, mg/L[j] | 3.8 | 5.4 | 229 | 9.4 | 9.5 |
| pH | 7.8 | 7.6 | 7.5 | 7.1 | 7.0 |

[a] groundwater A from Møllevej 9, 2990 Nivå;

[b] groundwater B from Sct. Jacobsvej 5-7, 2750 Ballerup;

[c] groundwate C from Skovlunde Byvej 96A, 2740 Skovlunde;

[d] groundwate D from Naverland 26AB, 2600 Glostrup;

[e] grounde E from 4930 Maribo, Denmark;

[f] only major contaminants are listed. The concentration shows as in the aqueous phase. To get the data, 5 mL original groundwater sample was transferred into 10 mL headspace vial, which of the vial was sealed by crimping. The headspace of the sample was taken and determined by gas chromatography equipped with headspace autosampler. TCE concentration in solution was calculated based on Henry's law;

[g] Grant alkalinity, determined by titration with 0.005M sulphuric acid;

[h] Anions determined by ion chromatography (Methrom, 833 IC, 8181IC Pump, 820 IC Separation Center, 819 IC Detector) using a Metrosep A Supp 5 100/0.4 column with Metrosep A Supp 4/6 Guard column. The eluent was composed of 3.2 mM Na$_2$CO$_3$, 1 mM NaHCO$_3$ and 2% acetone. Before determination, sample was filtered through a 0.45 µm syringe filter (Nylon, 25 mm, Mikrolab, Aarhus A/S);

[i] The groundwater sample was filtered through a 0.45 µm syringe filter (Nylon, 25 mm, Mikrolab, Aarhus A/S), followed by acidification with 3.5% HNO3. Afterwards, metals (Ca$^{2+}$, Mg$^{2+}$, K$^+$, Na$^+$) were measured by ICP-OES (Agilent 5100).

[j] 0.45 µm syringe filter filted groundwater sample analyzed using TOC-VCPN (Shimadzu, Japan) with potassium hydrogenphthalate as calibration compound.

All 5 groundwater samples were collected in different sites in Zealand, Denmark. The major contaminants are TCE or/and PCE with varied concentration. There were no big fluctuations with respect to pH and alkalinity, 7.0-7.8 and 238-381 mg·L$^{-1}$ unit, respectively, while the anion and cation concentrations were quite different, and thus provides a broader and representative groundwater compositions for TCE/PCE contaminated groundwater in Denmark.

Figure 20:
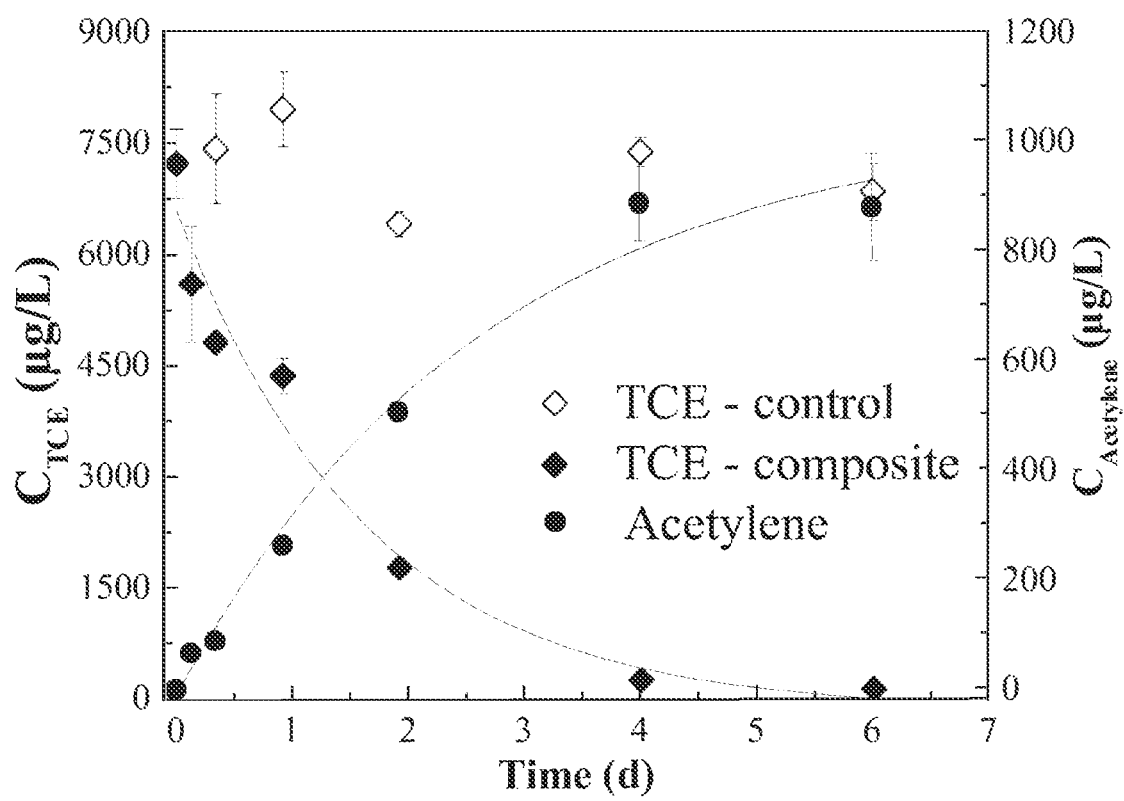
FIG. 20 shows reaction kinetics data from Example 11. Pseudo-first order kinetics of TCE reduction and acetylene formation in groundwater A by using GR-$BC_{AT}$ composite with $GR_{CI}$ of ~2.6 g·L$^{-1}$ and $BC_{AT}$ of 0.5 g·L$^{-1}$. Initial TCE mass is 0.45±0.03 µmol in each vial, that is 69±5 µM (7200±500 µg/L) in aqueous solution.

For groundwater A (FIG. 20), TCE at an initial concentration of ~7200 μg/L in the aqueous phase could be removed efficiently ($t_{112}$=1.08 d, Table 9) with acetylene as the only detected product. The total mass from TCE and acetylene could reach up to 98% of that of control samples (groundwater and volume-equivalent TI water), demonstrating that TCE was reduced to acetylene.

Figure 21:
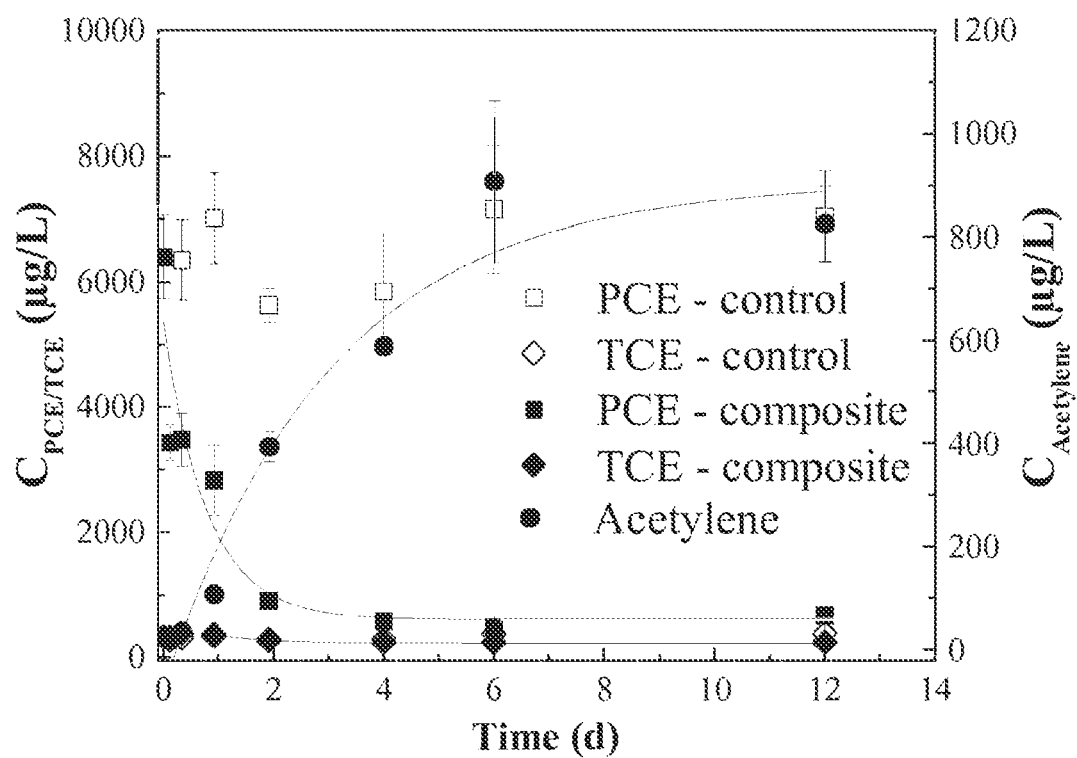
FIG. 21 shows reaction kinetics data from Example 11. Pseudo-first order kinetics of PCE/TCE reduction and acetylene formation in groundwater B by using GR-$BC_{AT}$ composite with $GR_{CI}$ of ~2.6 g·L$^{-1}$ and $BC_{AT}$ of 0.5 g·L$^{-1}$. Initial PCE mass is 0.40±0.04 µmol in each vial, that is 39±4 µM (6400±700 µg/L) in aqueous solution, while initial TCE mass is 0.021±0.003 µmol in each vial, that is 2.6±0.3 µM (340±40 µg/L) in aqueous solution.

For groundwater B (FIG. 21), the reduction rate of the major contaminant, PCE at initial concentration of ~6400 μg/L in the aqueous phase, was even faster than that of TCE in groundwater A, with $t_{1/2}$=0.53 d. TCE as the minor contaminant was not reduced immediately after contact with the composite, but the reaction was delayed approximately 1 day, after which TCE was removed. The contaminants-relevant mass balance could be up to 96% at the end of the sampling course, supporting that acetylene is the predominant product.

Figure 22:
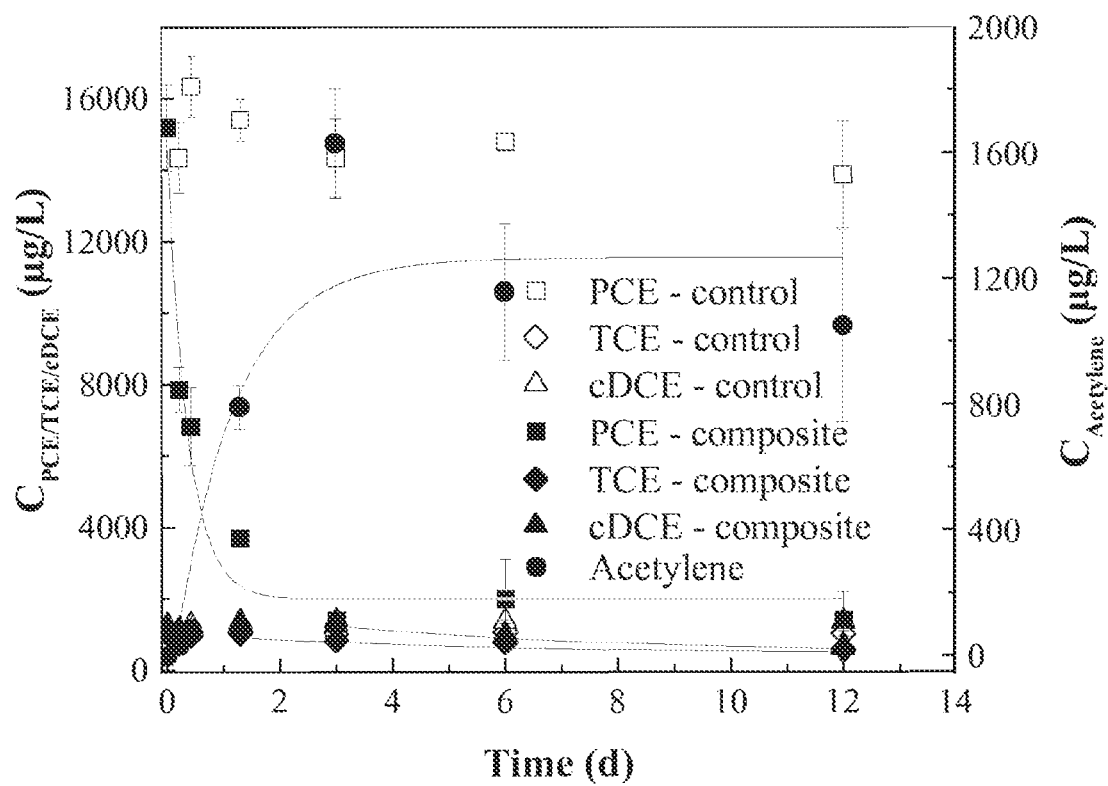
FIG. 22 shows reaction kinetics data from Example 11. Pseudo-first order kinetics of PCE/TCE/cis-DCE reduction and acetylene formation in groundwater C by using GR-$BC_{AT}$ composite with $GR_{CI}$ of ~2.6 g·L$^{-1}$ and $BC_{AT}$ of 0.5 g·L$^{-1}$. Initial PCE mass is 0.94±0.05 µmol in each vial, that is 92±7 µM (15000±1000 µg/L) in aqueous solution. Initial TCE mass is 0.064±0.003 µmol in each vial, that is 7.8±0.3 µM (1000±100 µg/L) in aqueous solution. Initial cis-DCE mass is 0.090±0.007 µmol in each vial, that is 13±0.9 µM (1300±100 µg/L) in aqueous solution.

Groundwater C (FIG. 22) is highly contaminated by PCE with minor TCE and cis-DCE. In this case, 15000 μg/L PCE was still reduced quickly by the GR-BC$_{AT}$ composite with $t_{1/2}$=0.25 d. Both TCE and cis-DCE reduction were greatly delayed, probably ascribed to competition among the three chlorinated ethylenes for reactive sites in the composite. The mass balance by summing PCE, TCE, cis-DCE and produced acetylene was at maximum 97% compared with that of the control at the 3rd day but it decreased to 70% at the end of sampling (12th day). No other less chlorinated intermediates or further reduced hydrocarbons such as ethylene was observed after 3 days, indicating that produced acetylene might be consumed by microorganisms.

Figure 23:
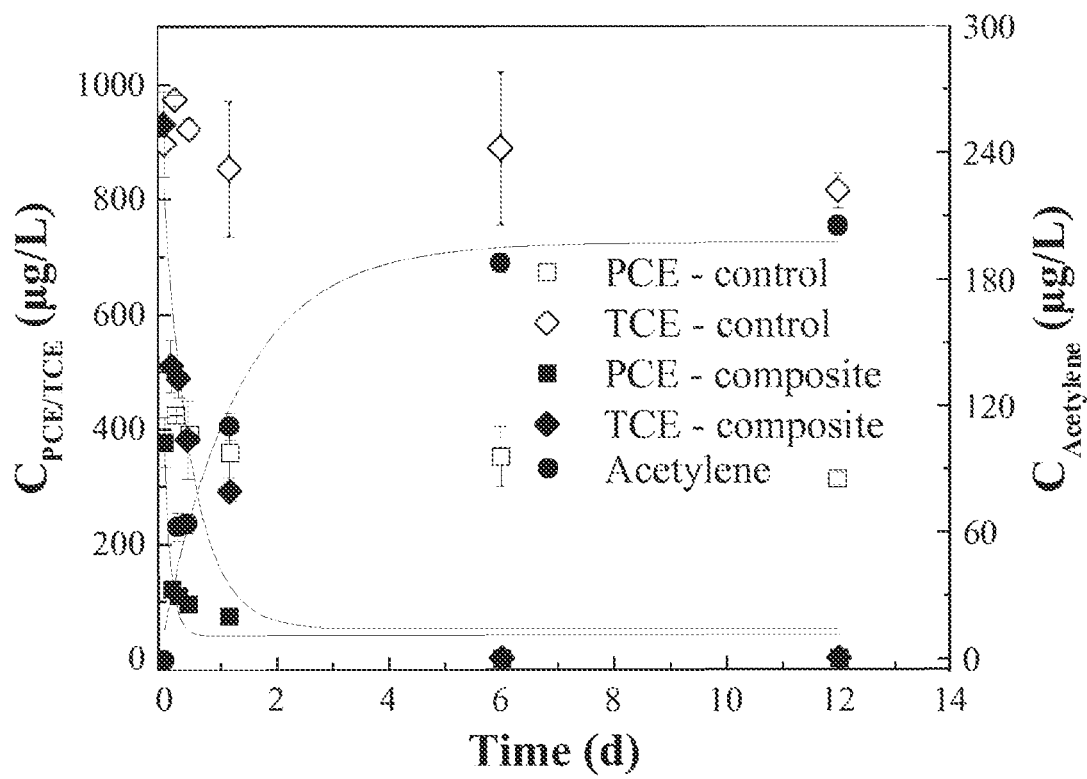
FIG. 23 shows reaction kinetics data from Example 11. Pseudo-first order kinetics of PCE/TCE reduction and acetylene formation in groundwater D by using GR-$BC_{AT}$ composite with $GR_{CI}$ of ~2.6 g·L$^{-1}$ and $BC_{AT}$ of 0.5 g·L$^{-1}$. Initial PCE mass is 0.023±0.002 µmol in each vial, that is 2.3±0.3 µM (380±40 µg/L) in aqueous solution. Initial TCE mass is 0.055±0.004 µmol in each vial, that is 6.8±0.4 µM (900±60 µg/L) in aqueous solution.
Figure 24:
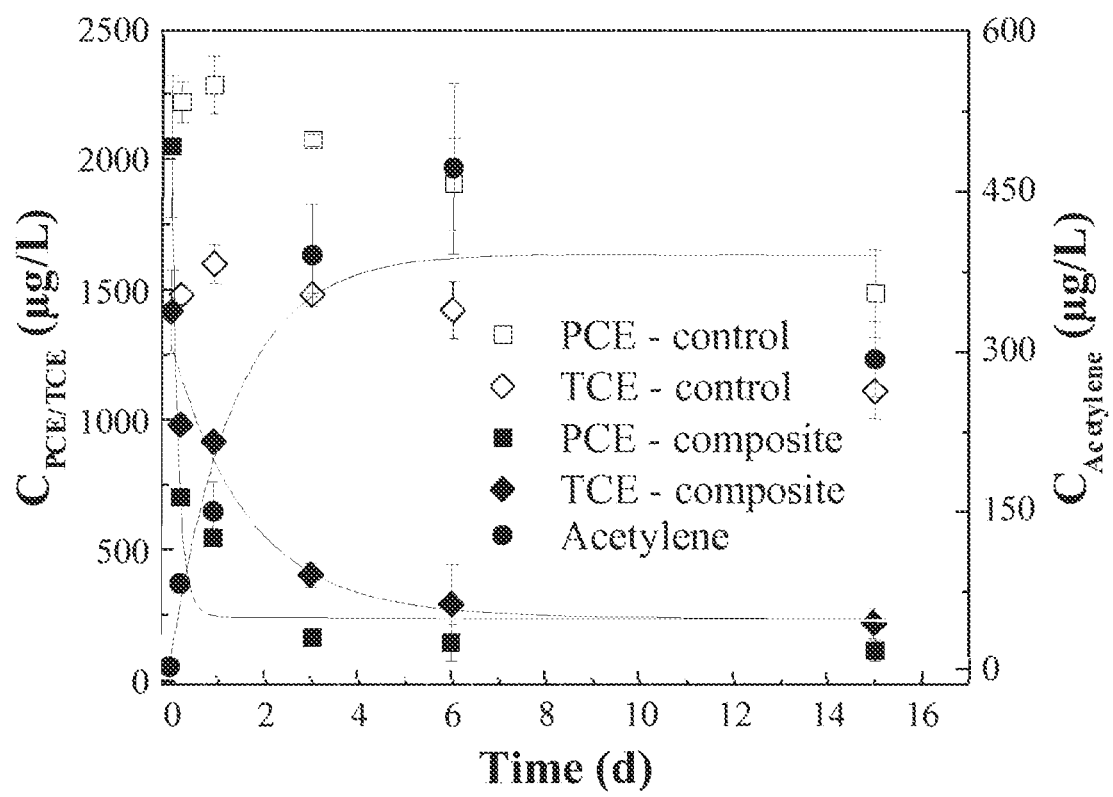
FIG. 24 shows reaction kinetics data from Example 11. Pseudo-first order kinetics of PCE/TCE reduction and acetylene formation in groundwater E by using GR-$BC_{AT}$ composite with $GR_{CI}$ of ~2.6 g·L$^{-1}$ and $BC_{AT}$ of 0.5 g·L$^{-1}$. Initial PCE mass is 0.13±0.01 µmol in each vial, that is 12±2 µM (2100±300 µg/L) in aqueous solution. Initial TCE mass is 0.091±0.005 µmol in each vial, that is 11±1 µM (1400±200 µg/L) in aqueous solution.

In contrast to other groundwater contaminants, PCE and TCE, in groundwater D (FIG. 23) are present at a very low level, that is 470 μg/L for PCE and 1100 μg/L for TCE in the original groundwater sample. Even though the TCE concentration is double the concentration of PCE, the reaction rate of PCE ($t_{1/2}$=0.08 d) is much higher than that of TCE ($t_{1/2}$=0.35 d) demonstrating that the composite preferably reacts with PCE. Similar as for the other examples of groundwater, both PCE and TCE in groundwater E (FIG. 24) were reduced fast over the GR-BC$_{AT}$ composite with $t_{1/2}$ of 0.43 d and 1.44 d, respectively. The mass balance by summing up PCE, TCE and acetylene reached 96% at the end of the experiment.

TABLE 9

Pseudo-first order kinetic parameters of dehalogenation of chlorinated ethylenes in 5 different naturally contaminated groundwaters.

| groundwater | main contaminant | $C_0{}^a$, μg/L | $k_{app}{}^b$, d$^{-1}$ | $t_{1/2}$, d | $R^2$ |
|---|---|---|---|---|---|
| A | TCE | 7200 ± 500 | 0.64 ± 0.20 | 1.1 | 0.95 |
| B | PCE | 6400 ± 700 | 1.3 ± 0.6 | 0.53 | 0.95 |
|   | TCE | 340 ± 40 | 1.1 ± 0.1 | 0.63 | 0.99 |
| C | PCE | 15000 ± 1000 | 2.8 ± 0.6 | 0.25 | 0.95 |
|   | TCE | 1000 ± 100 | 0.21 ± 0.20 | 2.9 | 0.80 |
|   | cis-DCE | 1300 ± 100 | 0.19 | 3.7 | —$^c$ |
| D | PCE | 380 ± 40 | 8.5 ± 3.3 | 0.08 | 0.88 |
|   | TCE | 900 ± 60 | 2.0 ± 0.9 | 0.35 | 0.84 |
| E | PCE | 2100 ± 300 | 6.4 ± 2.3 | 0.43 | 0.93 |
|   | TCE | 1400 ± 200 | 0.63 ± 0.04 | 1.44 | 1.00 |

$^a$C$_0$ refers to the initial concentration of contaminants in aqueous phase;
$^b$k$_{app}$, apparent first-order rate, fitting by function y = a + b * exp(-k * x) via OriginPro 9.1;
$^c$data could not be obtained due to too few data points Example 12: Different Acid Treated Bio Chars Composites made from different acid treated bio chars, and their reduction efficiency on the TEC reduction, and adsorption percentage after 1 day reaction was tested. The results are summarized in Table 10. Surprisingly high reduction efficiency of bone char, meat char, and mixtures of bone and meat char, shrimp char, anchovy char, and sludge char was observed. The tests of the acid treated bio chars indicate that surprisingly efficient remediation may be obtained when at least one of the carbon compositions comprises phosphorus, and/or nitrogen, and/or sulphur.

TABLE 10

Comparison of the composites made from different acid-treated biochars on TCE reduction efficiency and adsorption percentage after 1 day reaction.

| biochar | original biomass | supplier$^a$ | reduction efficiency$^b$ | adsorption percentage$^c$ |
|---|---|---|---|---|
| ATBC00 | Bone meal | Fluka, 89440 | 0.82 | 0.02 |
| ATBC40 | Bone and meat meal | From local | 0.78 | 0.50 |
| ATBC58 | Bone meal | From local | 0.85 | 0.16 |
| ATBana950 | Banana peel | Local supermarket | 0.02 | 0.96 |
| ATRM950 | Rye | Local supermarket | 0.01 | 0.11 |
| ATRICE950 | Rice | Local supermarket | 0.00 | 0.10 |
| ATSpirulina950 | Spirulina | Frontier Natural Products | 0.07 | 0.01 |
| ATShrimp950 | Shrimp flour | CommonBaits, Garnelenmehl/shrimp meal fischmeal Garnele | 0.75 | 0.51 |
| ATBlood950 | Blood flour | CommonBaits, Blutmeal Vollblutmehl | 0.32 | 0.04 |

TABLE 10-continued

Comparison of the composites made from different acid-treated biochars on TCE reduction efficiency and adsorption percentage after 1 day reaction.

| biochar | original biomass | supplier[a] | reduction efficiency[b] | adsorption percentage[c] |
|---|---|---|---|---|
| ATCW950 | Filtered coffee waste | From office | 0.18 | 0.81 |
| BTATCW950[d] | ATCW950 | | 0.22 | 0.50 |
| ATCORN400950 | Corn made char at 400° C.[e] | Corn flour was bought from supermarket | 0.11 | 0.73 |
| BTATCORN400950[f] | ATCORN400950 | | 0.22 | 0.49 |
| ATACV950 | Anchovy | CommonBaits, Fischmehl sardelle | 0.66 | 0.22 |
| ATSW950 | Silkworm | CommonBaits, Seidenraupen-Gemahlen | 0.09 | 0.16 |
| ATHM950 | Horn meal | Dehner bio Dünger | 0.14 | 0.18 |
| ATSB950 | soybean | CommonBaits, Vitamealo, Milchpulver | 0.31 | 0.28 |
| ATWorm950 | Mealworm | Futtertiere getrocknet | 0.04 | 0.18 |
| ATSG1950 | Sludge | BIOFOS, the water treatment plant at Rafshaleøen | 0.32 | 0.62 |
| ATSG2950 | Sludge | BIOFOS, the water treatment plant at Kanalhomen | 0.58 | 0.50 |
| AC[g] | — | NA | 0.05 | 0.75 |
| AC950[h] | AC | NA | 0.04 | 0.87 |
| ATAC950[i] | AC | NA | 0.03 | 0.63 |
| CAP[j] | — | Riedel-de Haën | 0.00 | 0.95 |
| CAP950[k] | CAP | | 0.00 | 0.96 |
| ATCAP950[l] | CAP | | 0.00 | 0.95 |

[a]suppliers for original biomass [b]reduction efficiency = Total mass of produced acetylene (μmol)/total mass of TCE from control sample (μmol), in which control samples are those without either $GR_{Cl}$ or $BC_{AT}$ added. [c]adsorption percentage = {[total mass of TCE from control sample (μmol) − total mass of TCE from reaction sample or BC control sample (μmol)]/total mass of TCE from control sample (μmol)}, in which BC control samples are those without $BC_{AT}$ added.
[d]that is the ATCW950 treated by 1M NaOH base.
[e]Corn flour was firstly charred at 400° C. at temperature increasing rate of 190° C./h and holds at 400° C. for 3 hours under oxygen-limited conditions, referring to CORN400. CORN400 was further treated by 950° C.-pyrolysis and then by acid washing as others acid-treated biochars
[f]that is the ATCORN400950 treated by 1M NaOH base
[g]pristine activated carbon
[h]the activated carbon was pyrolysis at 950° C. but without acid treatment
[i]AC950 was treated by 1M HCl
[j]pristine charcoal activated powder
[k]the charcoal activated powder was pyrolysis at 950° C. but without acid treatment
[l]CAP950 was treated by 1M HCl Example 13—Elemental Composition of Acid Treated Biochar The elemental composition of the acid-treated biochars of Table 10 are summarized in Table 11. For easy comparison, the TCE reduction efficiency and adsorption percentage are also included.

TABLE 11

Elemental composition of acid-treated biochars with TCE reduction efficiency and adsorption percentage.

| Biochar[a] | Reduction[b] | Adsorption[b] | C[d] | O[e] | H[d] | N[e] | S[d] |
|---|---|---|---|---|---|---|---|
| ATBC00 | 81.68 | 2.29 | 73.59 | 10.84 | 2.32 | 6.13 | 0.0017 |
| ATBC40 | 76.71 | 50.47 | 80.59 | 11.27 | 1.99 | 4.92 | 0.0013 |
| ATBC58 | 84.93 | 15.53 | 79.58 | 16.56 | 1.21 | 6.18 | 0.0068 |
| ATBana950 | 2.07 | 96.05 | 79.97 | 20.30 | 2.18 | 1.06 | 0.0023 |
| ATRICE | 0.42 | 9.55 | 86.78 | 12.07 | 1.45 | 2.32 | 0.0009 |
| ATRM950 | 0.53 | 10.55 | 86.03 | 14.76 | 1.72 | 2.40 | 0.0008 |
| ATSpirulina950 | 0.42 | 9.55 | 80.83 | 12.28 | 1.18 | 6.81 | 0.0008 |
| ATShrimp950 | 74.53 | 51.21 | 71.20 | 16.11 | 1.59 | 3.56 | 0.1449 |

TABLE 11-continued

Elemental composition of acid-treated biochars with TCE reduction efficiency and adsorption percentage.

| | | | | | | | |
|---|---|---|---|---|---|---|---|
| ATBlood 950 | 32.27 | 4.45 | 83.23 | 7.47 | 0.82 | 7.91 | 0.0165 |
| ATCW950 | 17.84 | 81.15 | 82.39 | 11.25 | 1.48 | 3.11 | 0.0322 |
| ATCORN400 950 | 10.58 | 73.41 | 61.69 | 12.11 | 1.25 | 1.55 | 0.0335 |
| ATACV950 | 65.62 | 21.80 | 71.23 | 10.23 | 0.95 | 6.80 | 0.0156 |
| ATSW950 | 9.09 | 15.90 | 81.25 | 8.89 | 0.83 | 5.24 | 0.0019 |
| ATHM950 | 14.33 | 18.15 | 82.19 | 6.44 | 0.76 | 7.54 | 0.0120 |
| ATSB950 | 30.61 | 28.44 | 75.57 | 11.28 | 1.18 | 3.93 | 0.0277 |

| Biochar[a] | P[e] | B[f] | Fe[f] | Cu[f] | Ni[f] | Zn[f] | Cr[f] |
|---|---|---|---|---|---|---|---|
| ATBC00 | 0.0573 | 0.0573 | 0.0052 | 0.0007 | 0.0001 | 0.0006 | 0.0000 |
| ATBC40 | 0.2284 | 0.2284 | 0.0254 | 0.0053 | 0.0004 | 0.0052 | 0.0001 |
| ATBC58 | 0.8532 | 0.8532 | 0.0348 | 0.0141 | 0.0010 | 0.0315 | 0.0001 |
| ATBana950 | 0.4767 | 0.4767 | 0.0013 | 0.0011 | 0.0003 | 0.0003 | 0.0000 |
| ATRICE | 0.6197 | 0.6197 | 0.0323 | 0.0087 | 0.0010 | 0.0085 | 0.0002 |
| ATRM950 | 0.2601 | 0.2601 | 0.0179 | 0.0056 | 0.0011 | 0.0055 | 0.0003 |
| ATSpirulina 950 | 1.2005 | 1.2005 | 0.1262 | 0.0079 | 0.0028 | 0.0055 | 0.0005 |
| ATShrimp 950 | 0.7750 | 0.7750 | 0.0768 | 0.0015 | 0.0017 | 0.0020 | 0.0042 |
| ATBlood 950 | 0.2629 | 0.2629 | 0.0096 | 0.0048 | 0.0005 | 0.0060 | 0.0000 |
| ATCW950 | 0.2629 | 0.0019 | 0.0198 | 0.0051 | 0.0005 | 0.0043 | 0.0001 |
| ATCORN400 950 | 0.2039 | 0.0003 | 0.0083 | 0.0003 | 0.0002 | 0.0002 | 0.0001 |
| ATACV950 | 1.4749 | 0.0004 | 0.0086 | 0.0017 | 0.0008 | 0.0100 | 0.0001 |
| ATSW950 | 2.0321 | 0.0008 | 0.0664 | 0.0181 | 0.0018 | 0.0789 | 0.0008 |
| ATHM950 | 0.0879 | 0.0006 | 0.0275 | 0.0011 | 0.0001 | 0.0081 | 0.0005 |
| ATSB950 | 1.2504 | 0.0005 | 0.0129 | 0.0095 | 0.0027 | 0.0254 | 0.0007 |

[a]different acid-treated biochars; for more details see Table 10.
[b]presents the reduction efficiency (%) after 1 day, i.e. (acetylene (μmol)/TCE in control sample (μmol)) × 100%, in which control samples only contain 5 mL water and 0.1 μmol TCE without either GR or biochar in 10 mL headspace vial.
[c]presents the adsorption percentage (%) after 1 day, i.e. [(TCE in control sample (μmol) − TCE in BC control sample (μmol))/TCE in control sample (μmol)] × 100%, in which BC control samples contain biochar at the same concentration of the composite used for reaction, that is 0.15 g/L, 5 mL water and 0.1 μmol TCE in 10 mL headspace vial; the TCE in control denotes the sample without BC added, but the same amount of TCE added.
[d]presented as weight percent, measured via 2400 Series II CHNS/O Elemental Analyzer under the mode of CHNS.
[e]presented as weight percent, measured via 2400 Series II CHNS/O Elemental Analyzer under the mode of Oxygen.
[f]measured by ICP-OES (Agilent Technologies 5100) and presented as mass percentage (%). To prepare samples, ~0.2 g acid-treated biochars were weighed accurately and transferred into a crucible, which was ashed at 1000° C. for 1 hour to transform biochar sample into ash. The ash in the crucible was digested by 8 mL concentrated HNO₃ (≥65%, EMD Millipore) and transferred to 50 mL volumetric flask with 2*4 mL concentrated HNO₃. After 2 days digestion, the volumetric flask was filled to 50 mL with Milli Q water, and the element concentrations determined by ICP-OES.

From Table 11 it is seen that the acid-treated biochars from different original biomass, showed varying elemental composition, and exhibited variable reduction efficiency (0.00-84.9%) and adsorption percentage (1.11-96.1%).

The major element component, C, ranges from 43.5-92.1 wt %, with N ranging from 0.22-7.91 wt %, O ranging from 6.44-20.30 wt %, H ranging from 0.76-2.32 wt %, P ranging from 0.00-4.49 wt %, B ranging from 0.0003-0.0061 wt %, S ranging from 0.00-0.14 wt %.

Trace of metal elements are also presented in the biochar, such as Fe (0.00-4.13 wt %), Cu (0.000-0.069 wt %), Ni (0.0000-0.0058 wt %) and Zn (0.000-0.079 wt %).

Both the elements concentration, as well as the structural properties of the composite, influence on the reductive reactivity.

Example 14—Reactivity of the GR-BC$_T$ Composite Towards PCE Degradation in Real Groundwater in the Presence of Sediments (Sand as Example)

Experimental set-up: a GR-BC$_{AT}$ stock slurry comprising ~13 g/L GR$_{CI}$ and 2.5 g/L BC$_{AT}$ was prepared separately. The batch experiment was carried out by mixing 1 mL above GR-BC$_{AT}$ stock slurry, 1.2 g sand and 4 mL groundwater B (see Table 8) in 10 mL headspace vial, resulting in final concentrations of GR$_{CI}$ of ~2.6 g/L, BC$_{AT}$ of 0.5 g/L and sand of 240 g/L.

Compared to the control samples which have the same experimental conditions but without sand added, it can be seen that the presence of high mass of sand did not show significant difference on PCE degradation rate (see Table 12). It indicates that the composition also works in the aquifer enriched sediments.

TABLE 12

Comparison of first-order kinetic of PCE degradation in the presence and absence of sand.

| Sample type | k$_{app}$, h$^{-1}$ | Standard error | t$_{1/2}$, h | R$^2$ |
|---|---|---|---|---|
| with sand | 0.28 | 0.07 | 2.5 | 0.961 |
| without sand | 0.15 | 0.03 | 4.6 | 0.981 |

Example 15—Reactivity of the Composite Comprising of GR Precursor and BC$_{AT}$ Towards TCE Degradation To synthesize GR precursor, 5 mL 0.5 M FeCl$_2$ stock solution (the same one used for synthesize GR$_{CI}$) was diluted by 90 mL $O_2$-free TI water in the glove box, which pH was then adjusted to 8 by 1 M NaOH which has been flushed with Ar to remove $O_2$ before use. Freshly synthesized GR precursor (white precipitate), mainly $Fe(OH)_2(s)$, was mixed with 3 mL 5 g/L $BC_{AT}$ stock suspension to produce the GR precursor-$BC_{AT}$ composite corresponding to a concentration of Fe(II) of 22 mM and $BC_{AT}$ of 0.15 g/L. A reactivity test of the composite was carried out via batch experiments as that for testing the GR-BC composite, in which 5 mL above GR precursor-$BC_{AT}$ stock was added into 10 mL headspace vial. Before the vial was crimped with magnetic cap and septum, 25 μL 4 mM TCE stock solution was spiked into the vial to give the initial total mass of TCE of 0.1 μmol in each vial.

The result showed that the composite comprising the GR precursor and $BC_{AT}$ also have reducing capacity towards TCE (Table 13). Although the reactivity of the GR precursor—$BC_{AT}$ was ~3 times lower than the GR-$BC_{AT}$ composite (calculated on $k_{app}$), the reaction rate is significant and indicates that the GR precursor may be of interest in remediation technologies. In cases where the GR precursor is already present in the natural environment, it would be sufficient to only add a suitable biochar into the contaminated field, resulting in formation of the composite in the aquifer. Once Fe(II) in the GR precursor becomes oxidized to Fe(III), GR is formed and reaction rates will should follow those known for GR-$BC_{AT}$ composites.

TABLE 13

The comparison of first-order kinetic constant, $k_{app}$, of TCE degradation by GR-$BC_{AT}$ composite and GR precursor -$BC_{AT}$

| Composite | $k_{app}$, $h^{-1}$ | Standard error | $R^2$ | $t_{1/2}$, h |
|---|---|---|---|---|
| GR-$BC_{AT}$ | 0.23 | 0.02 | 0.993 | 3.01 |
| GR precursor -$BC_{AT}$ | 0.07 | 0.01 | 1.000 | 9.90 |

REFERENCES

[1] Li et al., "Wheat straw biochar-supported nanoscale zerovalent iron for removal of trichloroethylene from groundwater", PLOS ONE, DOI:10.1371/journal.pone.0172337 (Mar. 6, 2017).

[2] Fan et al., "Chemical reactivity probes for assessing abiotic natural attenuation by reducing iron minerals", Environmental Science and Technology 50, 1868-1876 (2016).

The invention claimed is:

1. A composite for environmental remediation, comprising:
   one or more green rust compound(s), wherein the ratio between Fe(II) and Fe(III) of at least one of the green rust compound(s) is above 1:1, and
   one or more biochars.

2. The composite according to claim 1 wherein the anions of the green rust compound(s) are intercalated and are organic anions or inorganic anions or any mixtures thereof.

3. The composite according to claim 1 wherein the green rust compound(s) are layered iron hydroxysulphates, iron hydroxycarbonates, iron hydroxychlorides, or any mixtures thereof.

4. The composite according to claim 1 wherein the biochar(s) are obtained by a pyrolysis process carried out at a temperature above 300° C. or wherein the biochar(s) are non-crystalline, or amorphous, or nano-crystalline.

5. The composite according to claim 1 wherein the biochar(s) comprises phosphorus, or nitrogen, or sulphur, or oxygen, or hydrogen or combinations thereof, or wherein the biochar(s) comprises one or more functional group(s) containing oxygen.

6. The composite according to claim 1 wherein the biochar(s) are bone char, meat char, shrimp char, anchovy char, sludge char, grass char, woodchips char, wood pellets char, poultry litter char, corn straw, or any mixtures thereof.

7. The composite according to claim 1 wherein the biochar(s) are biochar doped with phosphorus or nitrogen or sulphur, or oxygen, or hydrogen, or combinations thereof.

8. The composite according to claim 1 further comprising elemental phosphorus or elemental nitrogen or elemental sulphur or combinations thereof.

9. The composite according to claim 1 wherein the content of phosphorus, nitrogen, sulphur, or combinations thereof is between 0.001 to 40 wt % of the biochar, or wherein the oxygen content is between 1 to 30 wt % of the biochar, or wherein the hydrogen content is between 0.01 to 5 wt % of the biochar.

10. The composite according to claim 1, comprising at least 5 wt % of biochar(s).

11. The composite according to claim 1, wherein the weight ratio between the biochar(s) and the green rust compound(s) is 5:95.

12. The composite according to claim 1 within one or more fluid(s).

13. The composite according to claim 12, wherein the one or more fluid(s) are water, aqueous based solvents, oil based solvents, or any combination thereof.

14. The composite according to claim 12, having a solid load between 0.001 to 50 wt %.

15. The composite of claim 1, that is in the form of powder having particles or particle agglomerates.

16. The composite of claim 15, wherein the one or more green rust compound(s) are incorporated or integrated with the one or more biochars.

17. The composite of claim 1, that is in the form of a slurry, suspension, or liquid.

18. The composite of claim 1, wherein individual molecules of the green rust and the biochar form particles on a molecular scale.

19. The composite according to claim 1, wherein the green rust compound(s) are layered iron hydroxysulphates.

20. A method for environmental remediation, comprising the steps of:
   contacting the composite of claim 1 with a contaminated media,
   wherein the contacting is obtained by mixing, flushing, or injection pumping, or combinations thereof, the composite into the media.

21. The method according to claim 20, wherein the contaminated media is groundwater, waste water, waste, soils, or sediments or combinations thereof.

22. The method according to claim 20, wherein the media is recalcitrant contaminated.

23. The method according to claim 20, wherein the contaminants are compounds that are chemically reducible, or wherein the contaminants are halogenated organic chemicals, a solvent of a chlorinated hydrocarbon, or mixtures thereof.

24. The method according to claim 20, wherein the remediation is dehalogenation, or remediation of nitrates, nitro-organic compounds, nitro aromatic compounds, or metal oxyanions, or combinations thereof.

* * * * *